Figure 1:
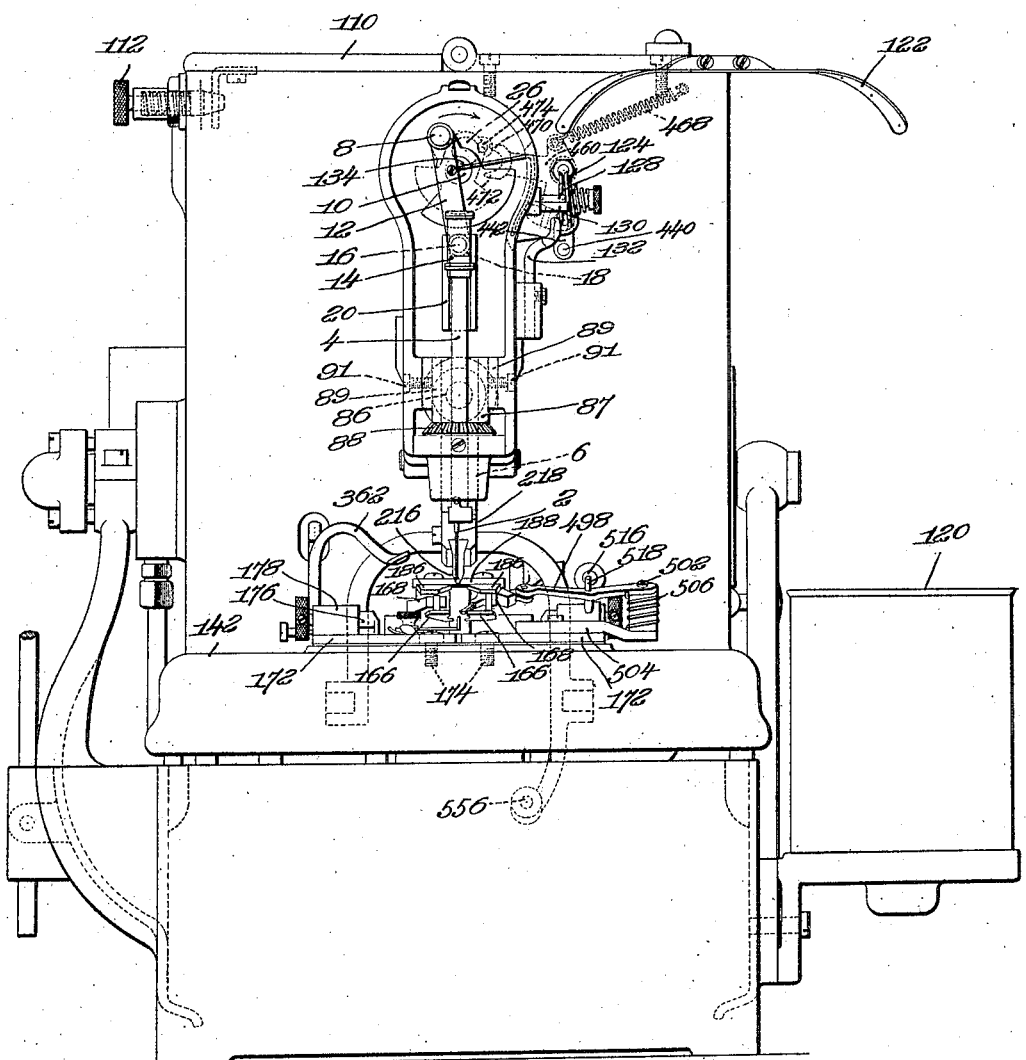

G. S. HILL.
BUTTONHOLE SEWING MACHINE.
APPLICATION FILED OCT. 13, 1917.

1,404,768.

Patented Jan. 31, 1922.
13 SHEETS—SHEET 1.

Witness
Frederick L. Greenleaf.

Inventor
George S. Hill
by Van Everen Fish & Hildreth
Attys.

G. S. HILL.
BUTTONHOLE SEWING MACHINE.
APPLICATION FILED OCT. 13, 1917.

1,404,768.

Patented Jan. 31, 1922.
13 SHEETS—SHEET 3.

Witness

Inventor
George S. Hill

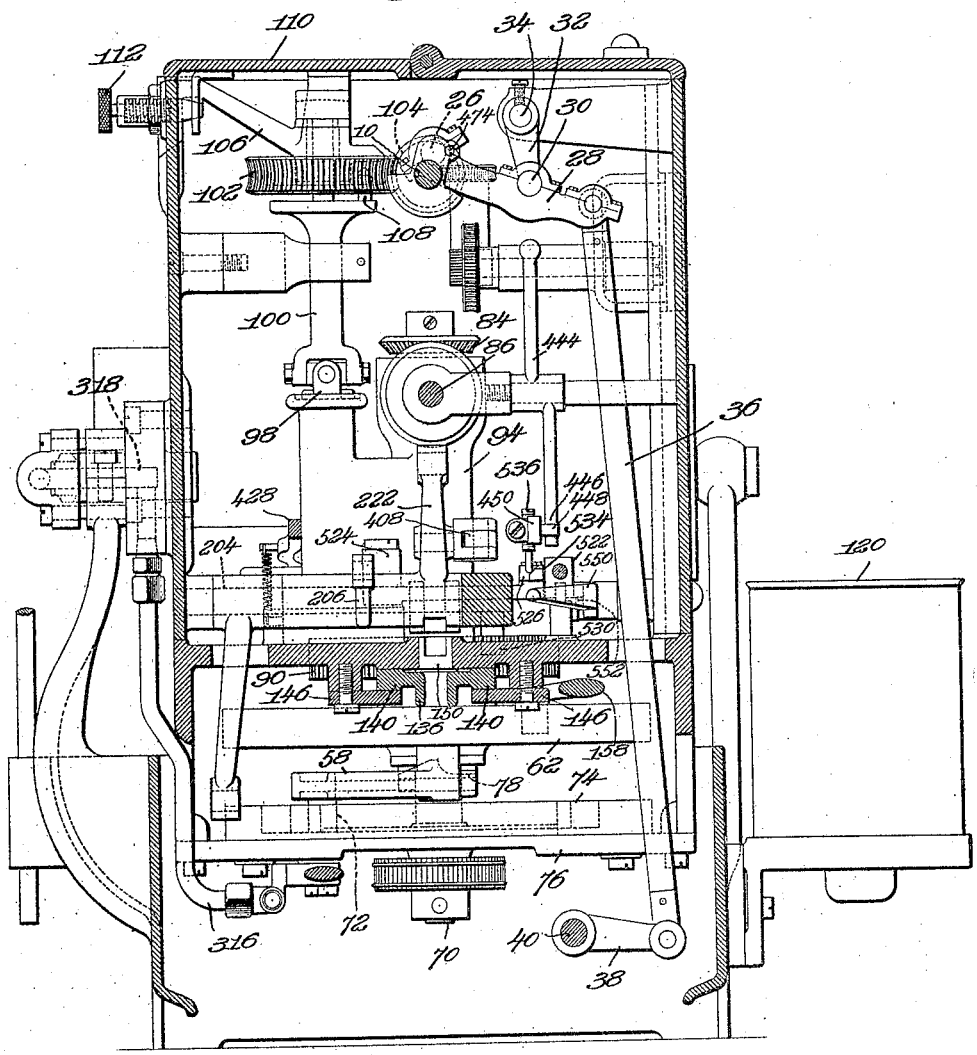

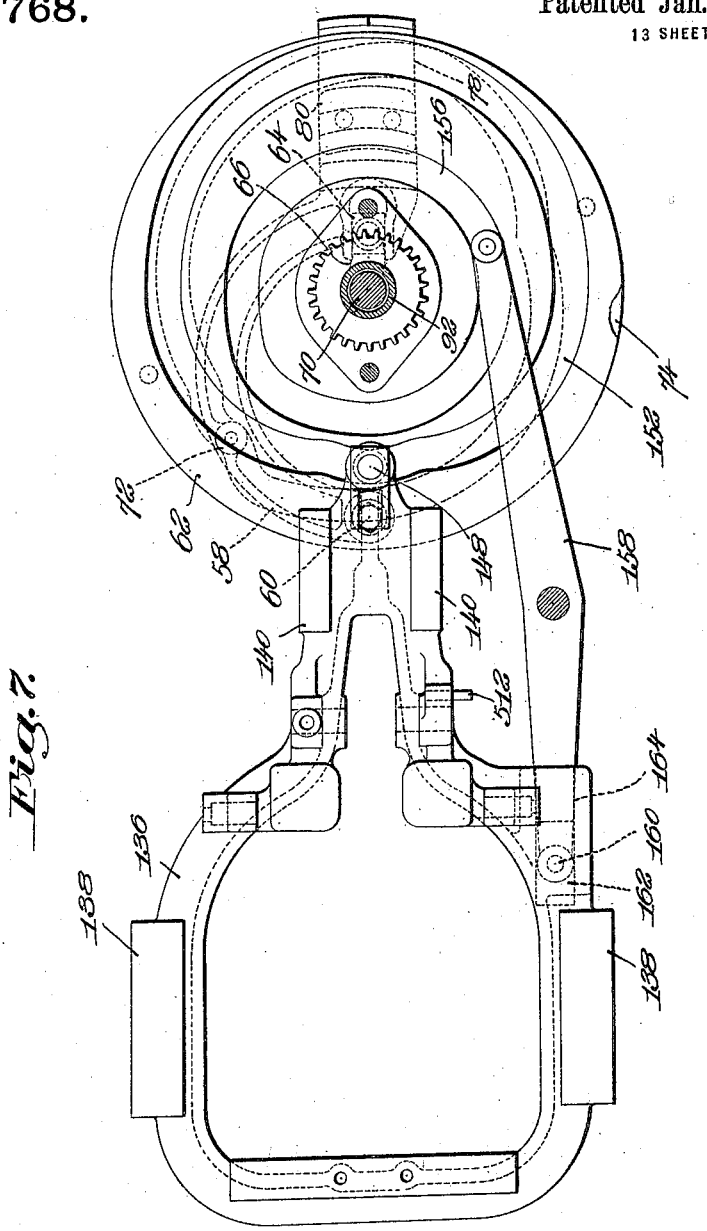

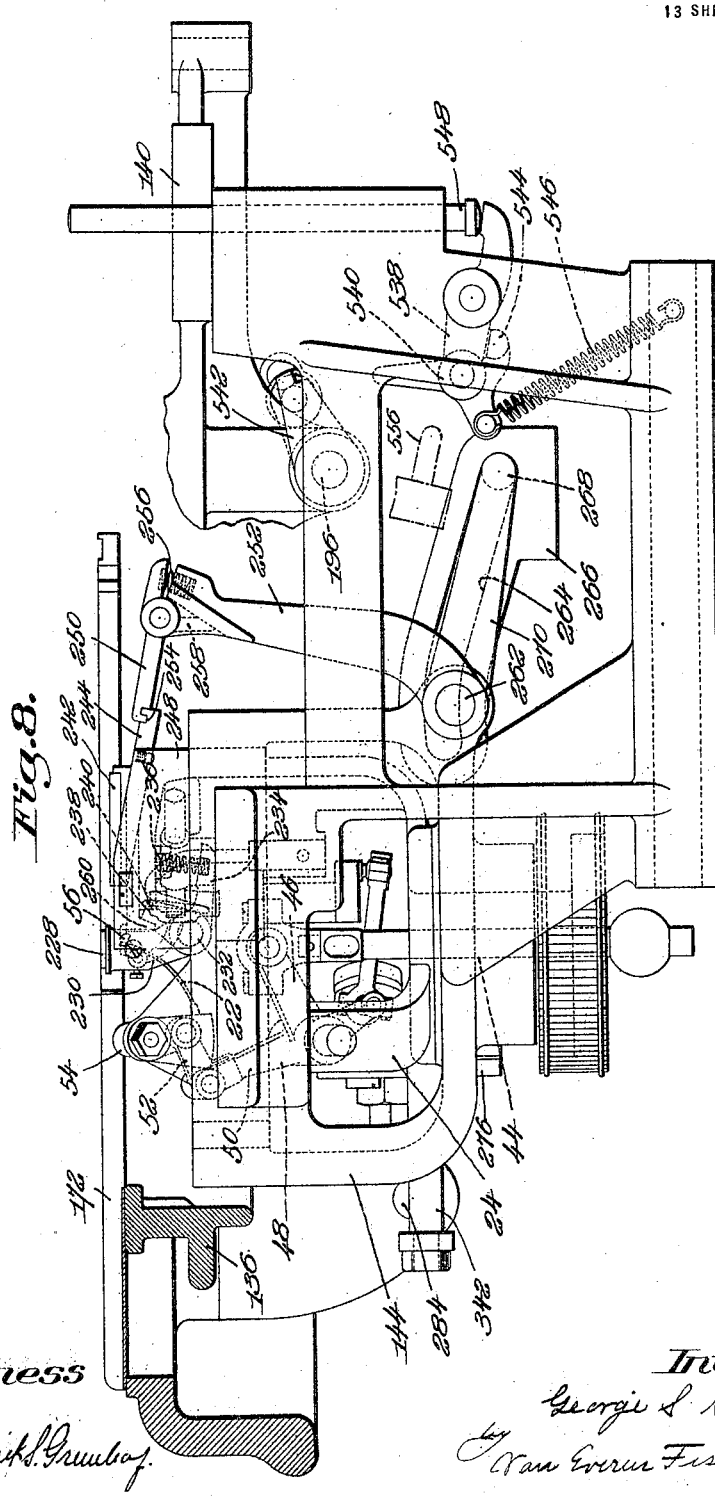

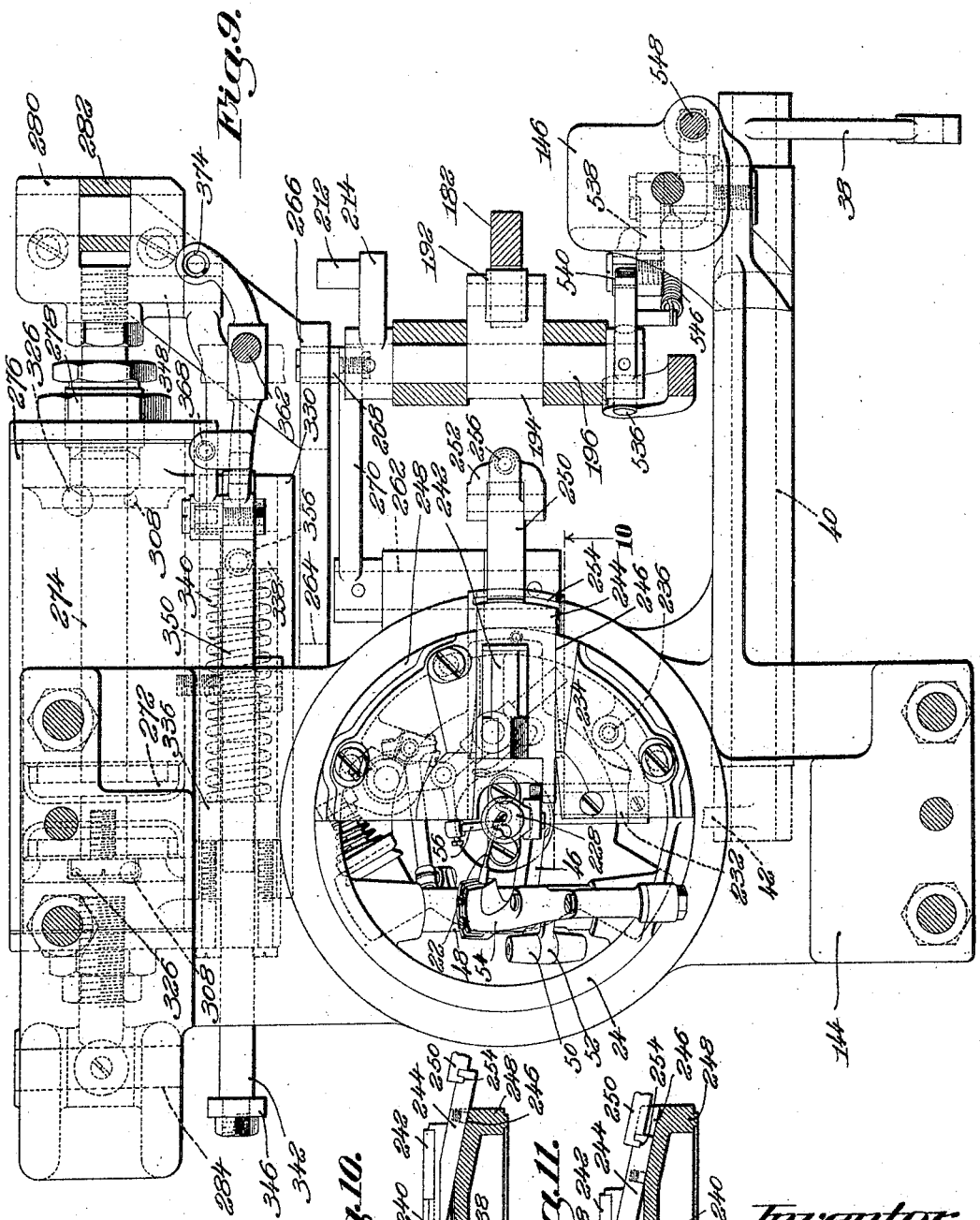

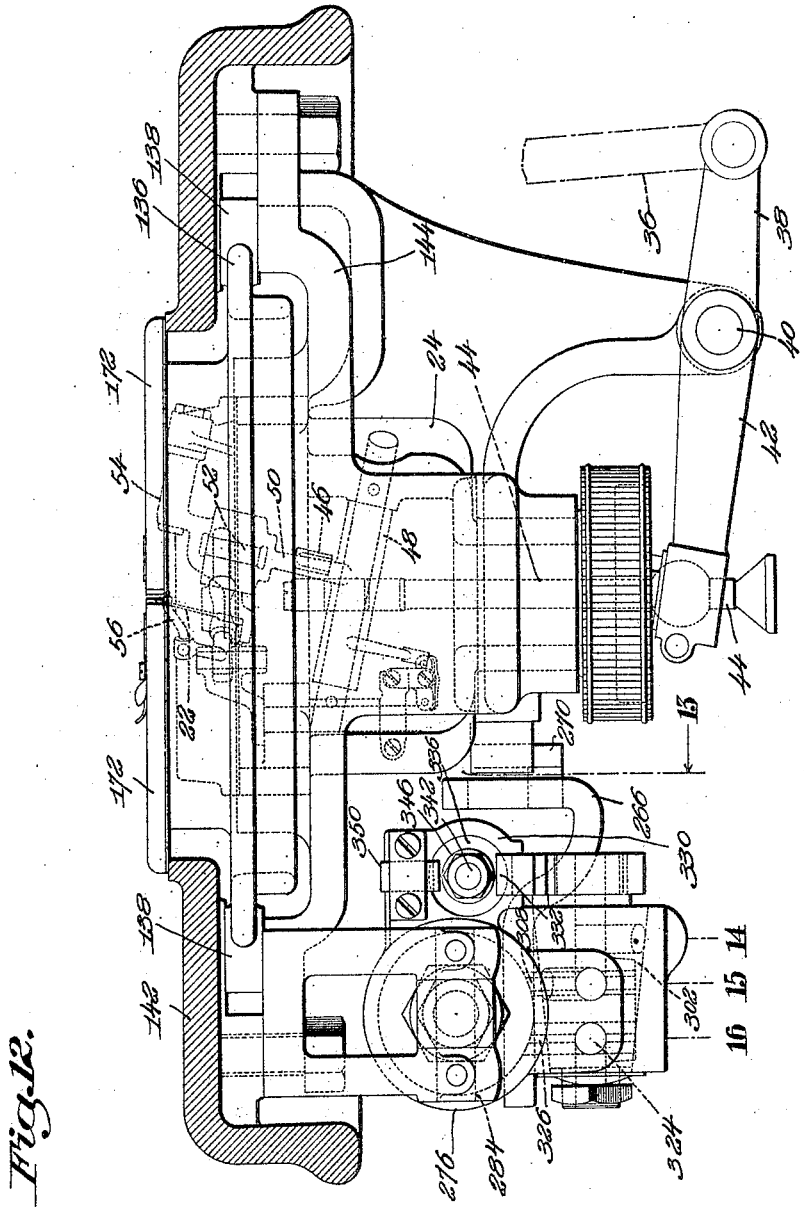

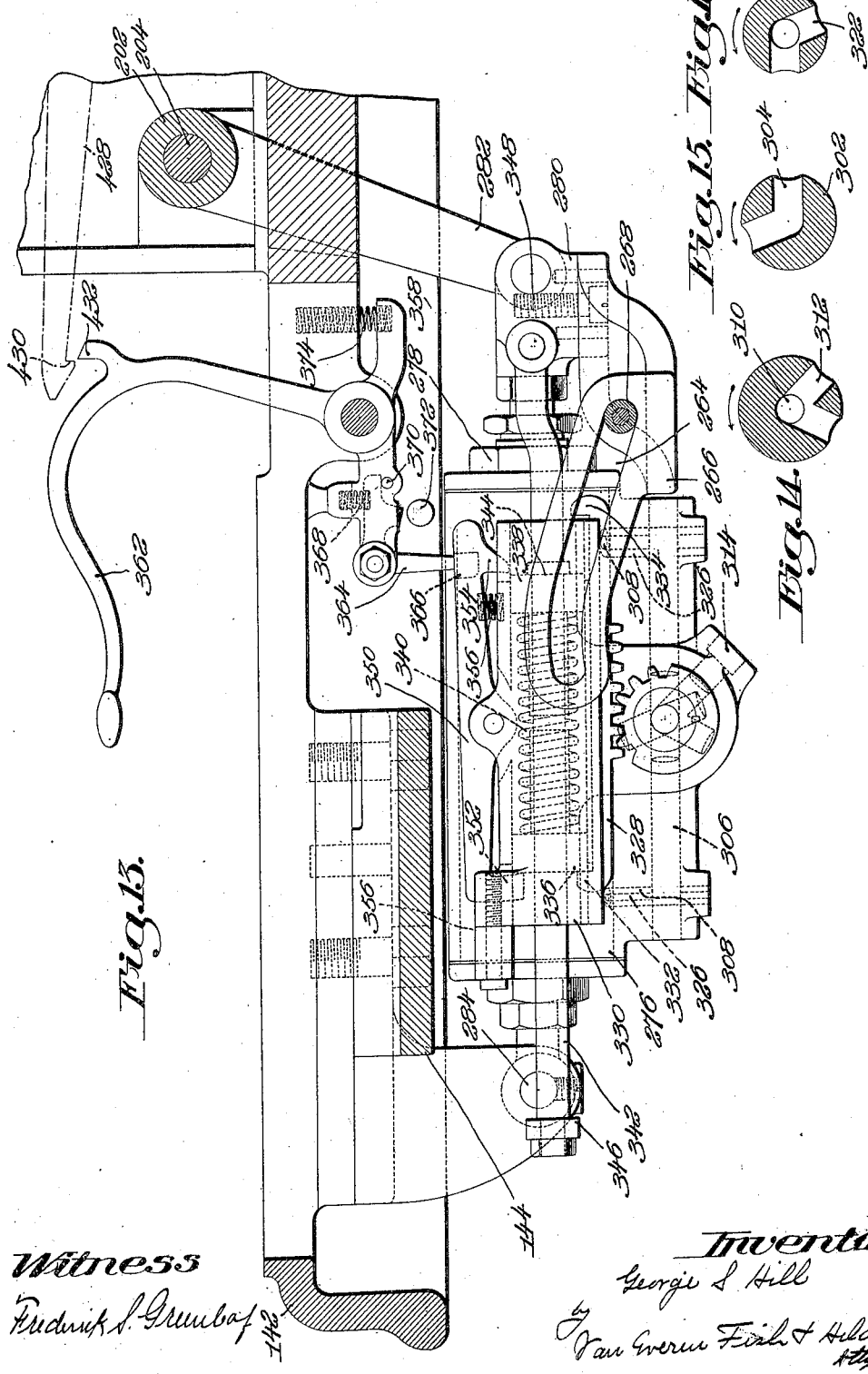

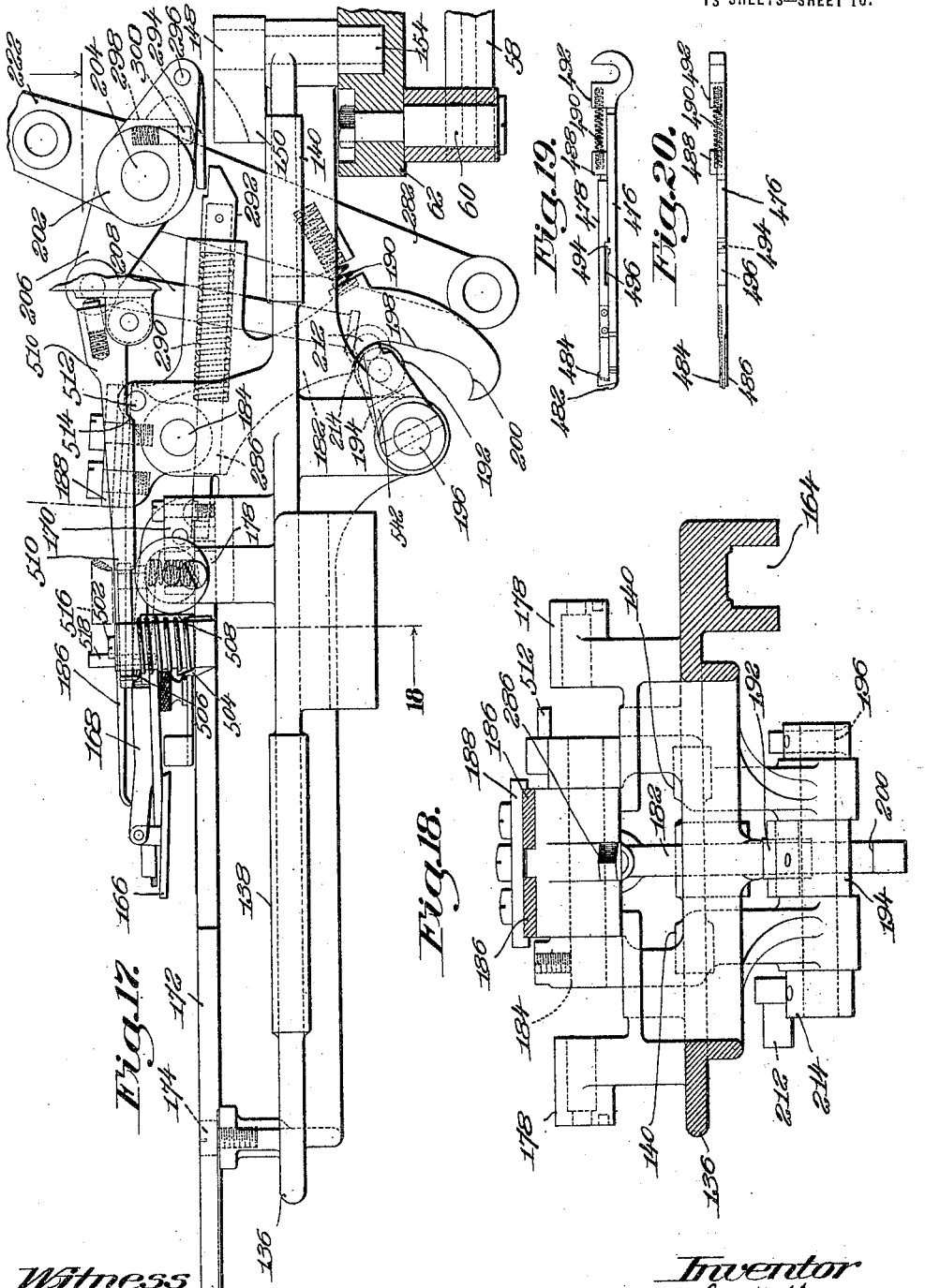

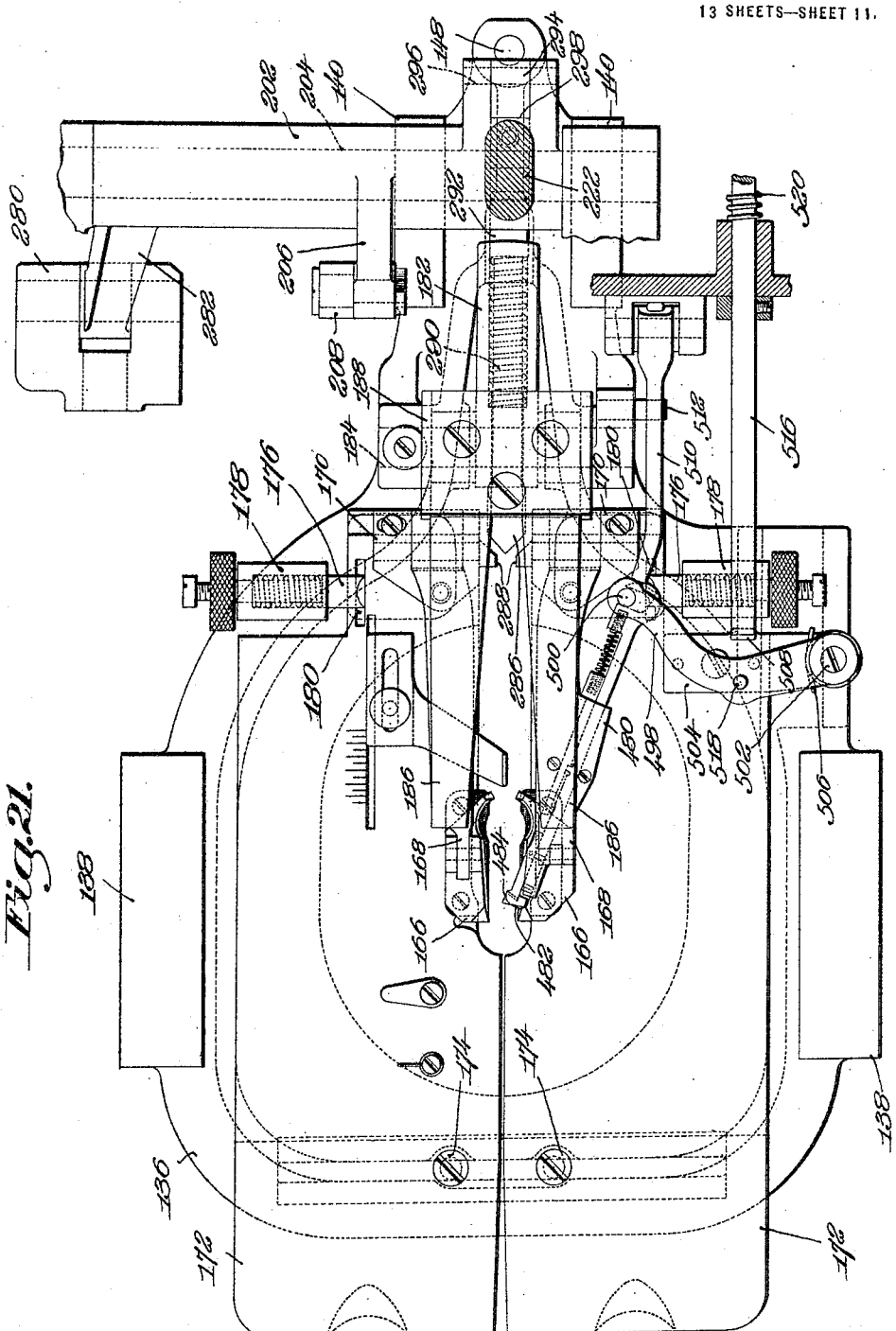

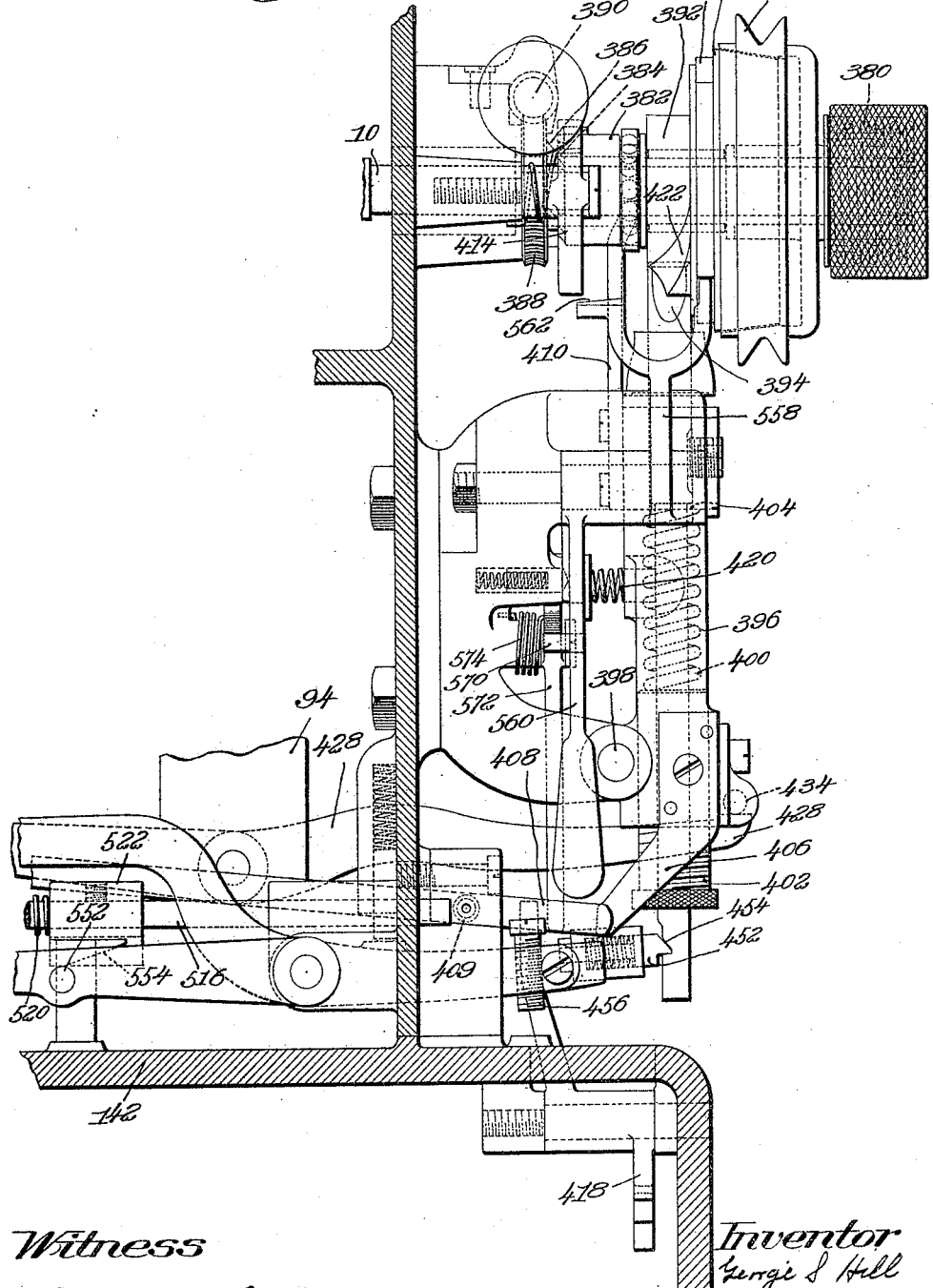

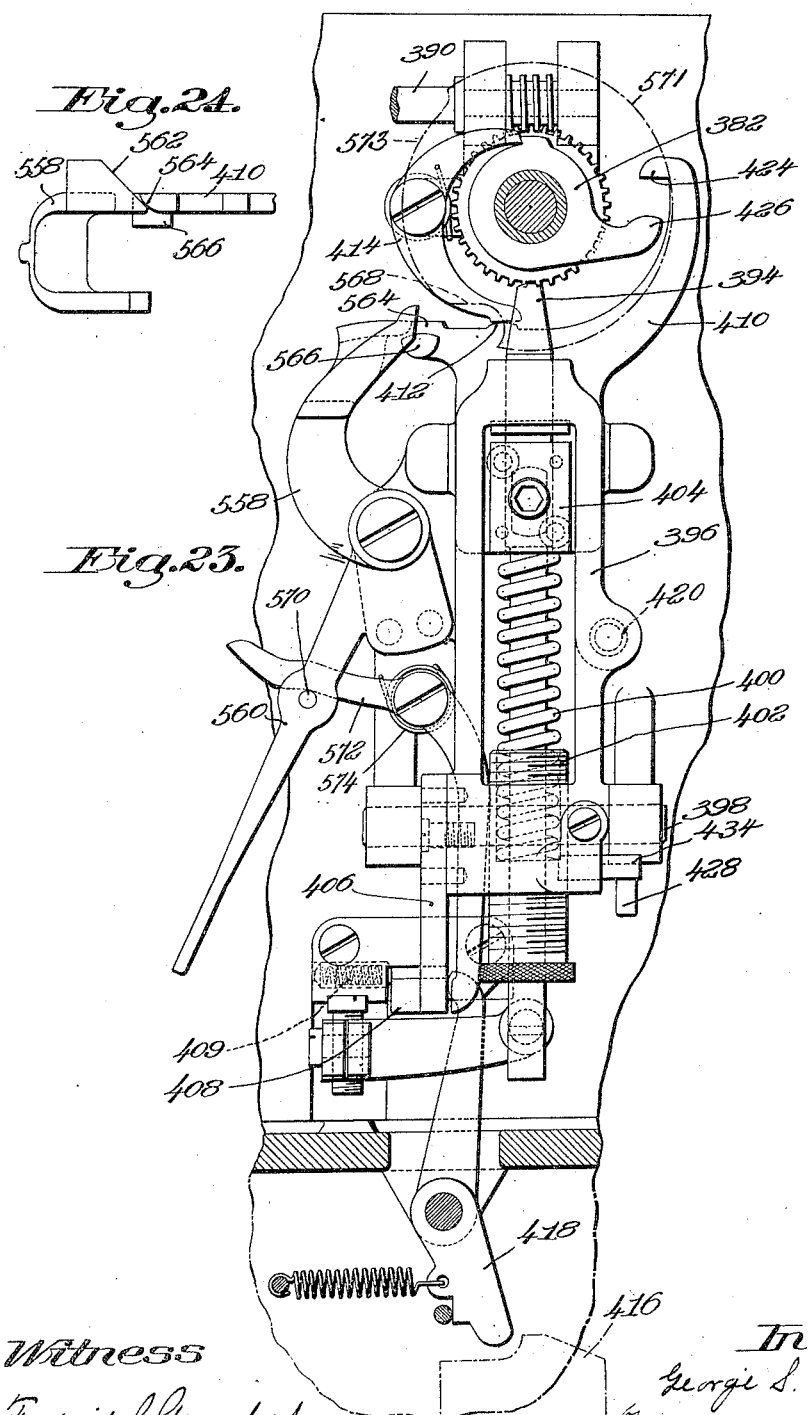

UNITED STATES PATENT OFFICE.

GEORGE S. HILL, OF STRAFFORD, NEW HAMPSHIRE, ASSIGNOR, BY MESNE ASSIGNMENTS, TO UNITED SHOE MACHINERY CORPORATION, OF PATERSON, NEW JERSEY, A CORPORATION OF NEW JERSEY.

BUTTONHOLE-SEWING MACHINE.

1,404,768.   Specification of Letters Patent.   Patented Jan. 31, 1922.

Application filed October 13, 1917. Serial No. 196,418.

*To all whom it may concern:*

Be it known that I, GEORGE S. HILL, a citizen of the United States, residing at Strafford, in the county of Strafford and State of New Hampshire, have invented certain new and useful Improvements in Buttonhole-Sewing Machines; and I do hereby declare the following to be a full, clear, and exact description of the invention, such as will enable others skilled in the art to which it appertains to make and use the same.

The invention relates to buttonhole sewing machines of that class in which a work holding clamp and a stitch forming mechanism are relatively movable to form overseam stitches along the sides and about one or both ends of a buttonhole.

It is the object of the invention to improve and simplify the construction, arrangement and mode of operation of the various parts and mechanisms of a machine of this type, whereby it is rendered more efficient and better adapted for high speed operation.

To this end one feature of the invention contemplates actuating those parts which are usually actuated prior to the beginning of the sewing by compressed air or other fluid under pressure, thus increasing the rapidity with which the work clamps are closed and spread preparatory to starting the sewing mechanism, and the rapidity with which the buttonhole is cut, in case the cutting precedes the sewing. The means for thus operating the parts preferably comprise a fluid actuated piston which is connected to operate the clamp closing mechanism and the mechanism for cutting the buttonhole slit during its advance movement, and to operate the spreading mechanism and finally start the stitch forming and feeding mechanisms during its return to initial position. The supply of fluid under pressure to the piston is so controlled that when the tripping mechanism is moved by the operator the piston is quickly reciprocated to actuate the parts connected therewith and start the sewing and feeding mechanisms, and then remains in initial position until the tripping mechanism is again operated. The interval required for effecting the operations preliminary to starting the sewing is thus reduced to a minimum with a resulting increase in the production of the machine.

A further feature contemplates releasing the tension of the upper needle thread, operating the thread cutter and holder, and operating the clamp opening mechanism from the stop motion for the sewing mechanism, so that these operations are instantly performed and in proper sequence as the sewing is completed, thus increasing the speed and consequently the production of the machine.

In addition to the features outlined above, the invention includes further features of construction and combinations of parts contributing to the simplicity, speed and efficiency of the machine, the advantages of which will be evident to those skilled in the art from the following detailed description of the machine shown in the drawings.

Figures 2, 3:
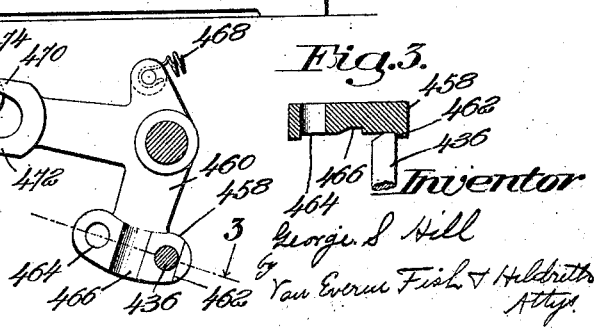
Figure 4:
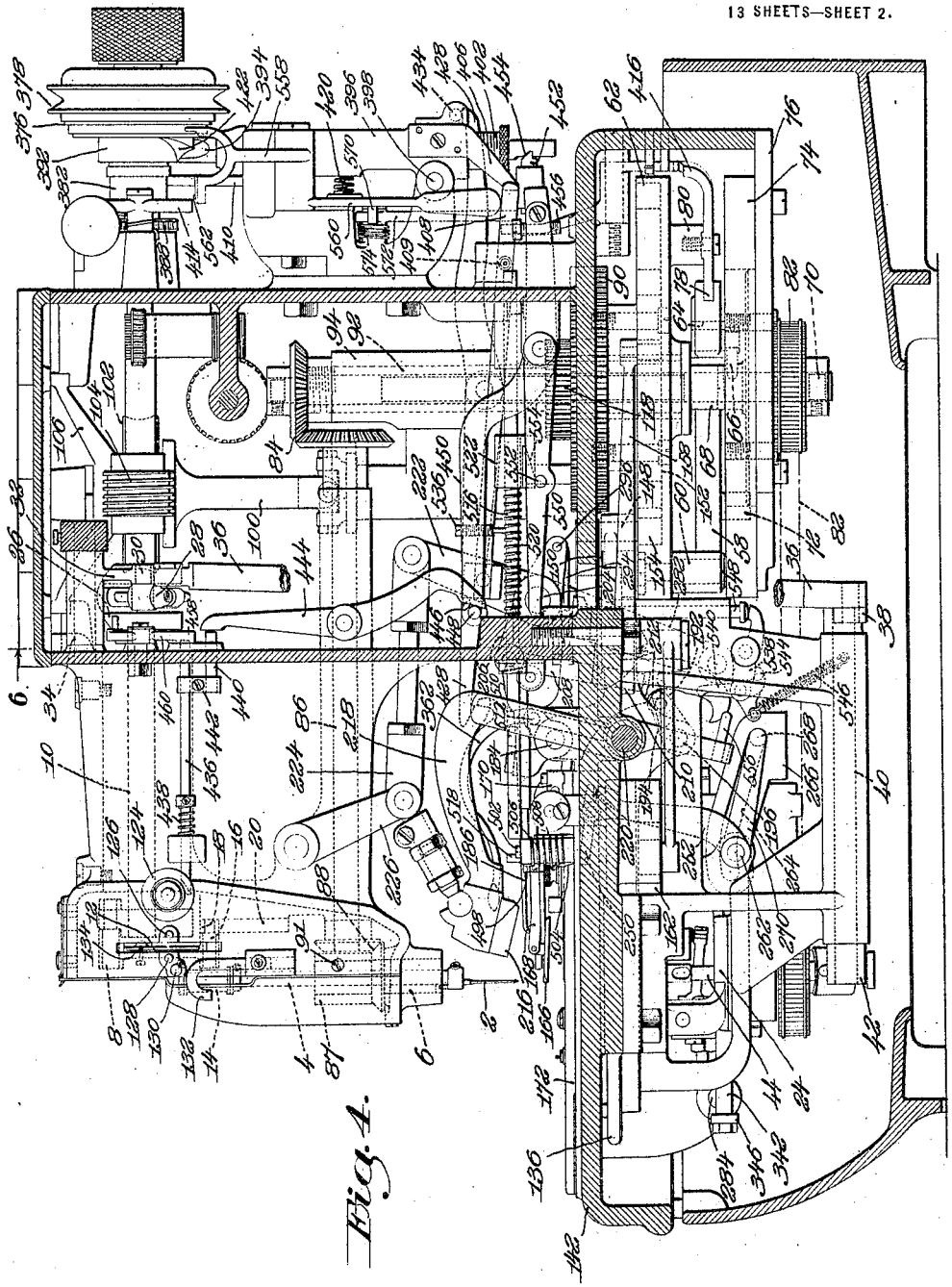
Figure 5:
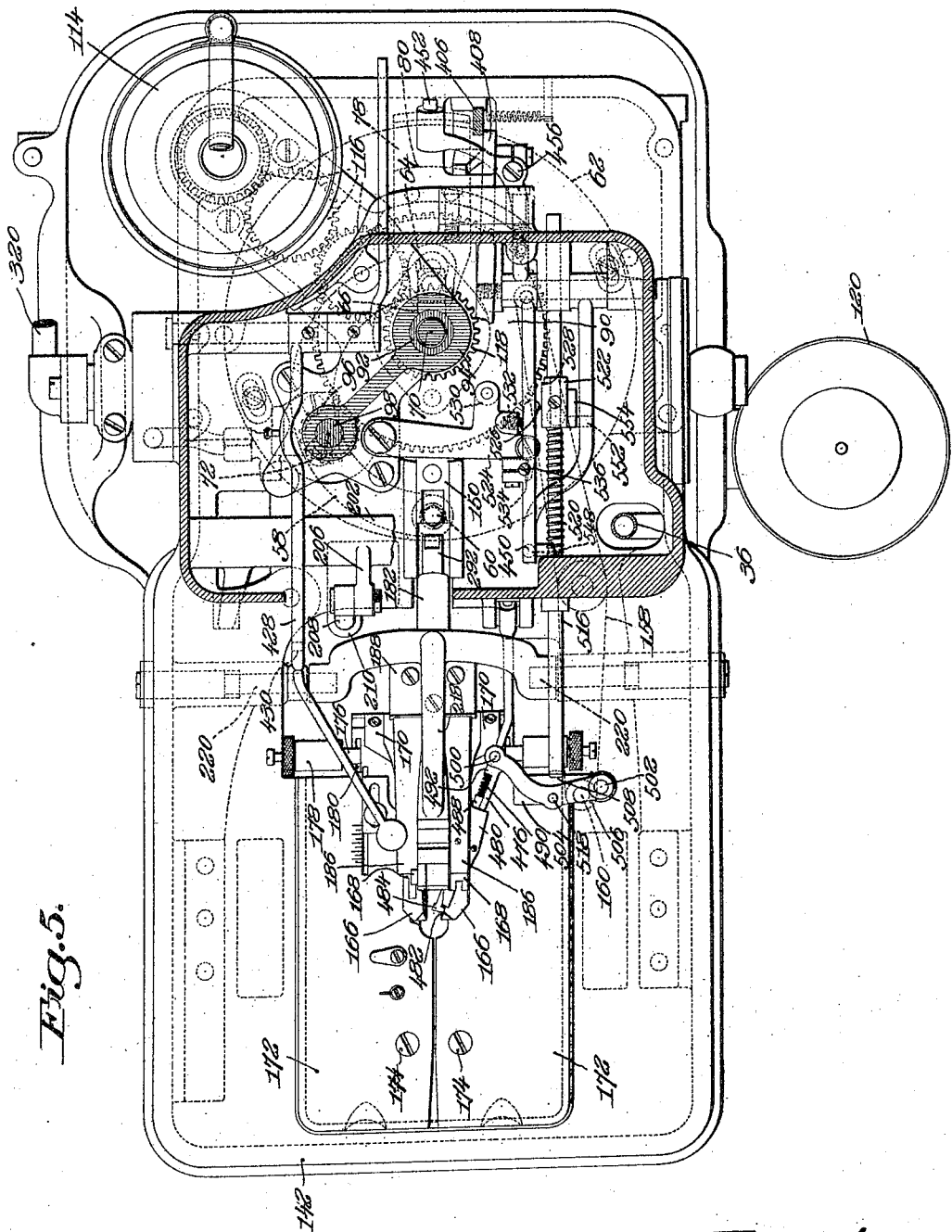

In the drawings, Figure 1 is a front elevation of a buttonhole sewing machine embodying the various features of the invention in their preferred forms; Fig. 2 is a detail of the tension releasing mechanism; Fig. 3 is a sectional view on line 3, Fig. 2; Fig. 4 is a side elevation, the machine frame and supporting base being shown in section; Fig. 5 is a sectional plan view, certain of the parts being omitted to more clearly show the mechanisms beneath them; Fig. 6 is a transverse sectional elevation substantially on line 6 of Fig. 4; Fig. 7 is a detail plan view showing the clamp carriage, the feed cams and the mechanism for rotating the stitch forming mechanism; Fig. 8 is a sectional side elevation showing the turret and some of the associated parts; Fig. 9 is a plan view of the parts shown in Fig. 8; Fig. 10 is a sectional detail on line 10, Fig. 9; Fig. 11 is a similar detail showing the parts in a different position; Fig. 12 is a sectional end elevation of the parts shown in Fig. 8; Fig. 13 is a sectional side elevation substantially on line 13, Fig. 12; Figs. 14, 15 and 16 are sectional views through the controlling valve on lines 14, 15 and 16, Fig. 12; Fig. 17 is a detail side elevation of the clamp carriage and some of the associated parts; Fig. 18 is a sectional elevation on line 18, Fig. 17; Fig. 19 is a detail plan view of the thread cutting and holding slide bars; Fig. 20 is a side elevation of these parts; Fig. 21 is a plan view of the parts shown in Fig. 17; Fig. 22 is a side elevation showing the mechanism for driving and stopping the sewing shaft and the parts associated therewith; Fig. 23 is an end elevation, partly in section, of the parts shown in Fig. 22; and Fig. 24 is a detail plan view of the parts shown in Fig. 23.

In the drawings the invention is shown embodied in a machine for making buttonholes in which the overseam extends along the sides and about both ends of the buttonhole, the buttonhole slit being cut and spread before the sewing begins. The machine comprises in general a cutter for cutting the buttonhole slit, a work clamp which is movable lengthwise and laterally of the buttonhole, a stitch forming mechanism which is rotated during the sewing about the eye and about the bar end of the buttonhole, and a thread cutter and holder for cutting the upper needle thread at the completion of the buttonhole and holding its end until the sewing of the succeeding buttonhole has begun. The buttonhole cutter is mounted in fixed relation to the sewing mechanism, and is constructed to cut the buttonhole slit in register with the sewing mechanism, thus avoiding the delay incident to bringing the work into position for sewing after cutting the slit out of register with the sewing mechanism. The stitch forming mechanism comprises a straight eye-pointed upper needle which is arranged to penetrate the work a short distance from the edge of the buttonhole slit, a curved eye-pointed under needle which is arranged to pass up through the button-hole slit, and which, at the upper end of its stroke, is dipped to throw out a loop down through which the upper needle passes, and a looper arranged below the work and operating to take a loop of upper needle thread and carry it into such position that the under needle will pass up through it during its up stroke.

As shown, the upper needle 2 is secured in the lower end of a hollow needle bar 4 which is mounted to reciprocate through and to turn with a rotary head 6. The needle bar is reciprocated by a crank 8 carried on the forward end of the sewing shaft 10, and connected by a link 12 with a sleeve 14 held between collars on the bar. The pivot pin 16 for the lower end of the link 12 projects beyond the rear face of the link, and engages a bearing block 18 arranged to reciprocate in a guideway 20 formed in the machine head, and acting to guide and steady the upper end of the needle bar.

The under needle 22 which is mounted upon a rotary turret 24 is actuated by a second crank 26 formed on the sewing shaft and engaging one end of a lever 28 (Figs. 4, 6, 8 and 12). The lever 28 is supported intermediate its ends upon a swinging fulcrum pin 30 projecting from an arm 32 pivoted on a stud 34. The outer end of the lever is connected by a link 36 with an arm 38 secured to one end of a rock shaft 40. An arm 42 is secured to the other end of the rock shaft 40 and is connected by a ball and socket joint with the lower end of a hollow link 44, the upper end of which is connected to a substantially horizontal arm 46 projecting from a rocking sleeve 48 which is mounted on the turret. The rock sleeve is provided with a vertical arm 50, the upper end of which is connected by a link 52 with a swinging carrier 54 in which the under needle is mounted. The arm 50 and link 52 are so arranged that the pivotal connection between them passes the line of centers during the movement of the arm 50 toward the right in Fig. 8, so that the under needle is dipped at the end of its upward stroke to form a loop for the passage therethrough of the upper needle. The swinging arm 32 on which the crank lever 28 is fulcrumed is so arranged, and the parts are so proportioned that during the first part of the revolution of the sewing shaft from the stopped position indicated in the drawings the fulcrum 30 will swing upward as the crank 26 moves downward, thus giving a rapid movement to the end of the crank lever which is connected by the link 36 with the under needle mechanism. The under needle is therefore quickly advanced to its upper position and dipped while the upper needle is starting its downward stroke, while the return stroke of the under needle is delayed until the upper needle has passed through the loop of under needle thread and penetrated the work. The looper 56 is constructed and arranged like the looper of Patent No. 1,134,046, dated March 30, 1915, and is operated from the rock sleeve 48 in a similar manner. By properly proportioning the crank lever and swinging fulcrum arm 32, and properly arranging the arm, the movements of the under needle and looper may be accurately timed with relation to the movements of the upper needle when reciprocated by a simple crank movement, and the sewing mechanism may be driven at high speed without strain or material wear upon the parts.

The turret 24 and the upper needle head 6 are given a single revolution during the sewing of each buttonhole, and are rotated, rotation after rotation, in the same direction in sewing successive buttonholes, as in the machine of Patent No. 1,063,880, dated June 3, 1913. The mechanism for thus rotating the sewing mechanism is similar to that shown and described in Patent No. 1,063,795, dated June 3, 1913, and comprises an arm 58, one end of which is supported upon a stud or crank pin 60 carried by the feed cam disc 62, and the other end of which is slotted to embrace a pivot block 64 carried on a pin on the outer end of a crank arm 66, the hub 68 of which is secured to a vertical shaft 70. The arm 58 carries a roll 72 which travels in a cam groove formed in a disc 74 which is secured to a fixed bracket 76. The slotted end of the arm 58 is supported and guided by a guide plate 78 secured to a lug 80 on the under side of the disc 62, and engaging a slot in the end of the arm. The lower end of the shaft 70 is connected by a sprocket chain 82 with a turret, while the upper end of the shaft is connected through bevel gears 84, horizontal shaft 86, and bevel gears 88 with the upper needle head 6.

The head 6 is in the form of a sleeve projecting above and below the gear 88, which may be formed upon or secured to the sleeve in any suitable way. The lower part of the sleeve is fitted to turn in a bearing in the head of the machine, while the upper part of the sleeve is fitted to turn in a bearing block 87. The bearing block is provided with grooves on its sides which engage short ribs 89, formed on the head of the machine. The head is recessed above the ribs so that the bearing block may be slid vertically into position between the ribs and then secured by the screws 91. This construction provides an adequate bearing for the needle bar so that a short light bar may be used, and also efficiently supports the rotary head or sleeve by bearings arranged both above and below the point at which the actuating means through which the sleeve is rotated is connected with the sleeve.

The feed cam disc 62 is secured to a gear 90, and these parts are mounted to rotate upon a hollow stud 92 which is secured in a bearing bracket 94 and within which the shaft 70 rotates. The cam disc is driven from the sewing shaft during the sewing through a pinion 96 engaging the gear 90 and secured to the lower end of a shaft 98 which is mounted in an arm of the bearing bracket 94. The upper end of the shaft 98 is connected by a universal joint to the lower end of a shaft section 100, the upper end of which carries a worm wheel 102 engaging a worm 104 on the sewing shaft. The gear 102 is mounted in a removable bearing plate 106, and is connected with the shaft by a pin 108 engaging a hole in the web of the worm wheel. The bearing plate is provided with three arms arranged to enter positioning recesses in the upper edge of the machine casing when the cover plate 110 is raised and to be locked in position when the cover plate is closed and retained by the spring-pressed locking pin 112. The worm wheel 102 may be removed and another wheel substituted to vary the number of stitches in the overseam.

The stay cord and under thread are led to guides on the turret through the hollow link 44 from guides on a rotary support 114 which carries the cord supply, as in the machine of Patent No. 1,063,880. The rotary support is rotated in unison with the stitch forming mechanism through gearing indicated at 116 (Fig. 5) which connects the support with a gear 118 secured to the hollow stud 92. The upper needle thread leads from a thread supply indicated at 120 in Fig. 1 through the holes of a guide strip 122, between the discs of a tension 124, over guide pins 126, 128 and 130, and under the vertically adjustable guide finger 132, from which it passes to the upper end of the hollow needle bar. The thread passes down through the needle bar through an opening at the lower end of the bar, and thence through suitable guides or light tension devices to the needle eye. During the sewing the thread is acted upon by a thread controller 134 carried by the link 12 and arranged to pass down between the guide pins 126 and 128 and to take up slack in the upper needle thread when the looper releases the loop taken by it during the previous reciprocation of the needle.

The work clamps which clamp and hold the work during the sewing are mounted upon the clamp carriage 136 provided with flanges having bearing surfaces 138 and 140 (Figs. 4, 6, 7, 12, 17 and 21). The bearing surfaces 138 fit between bearing surfaces on the under side of the base plate 142 and bearing surfaces on the upper side of the turret bracket 144. The bearing surfaces 140 fit between bearing surfaces on the under side of the base plate and bearing surfaces on the upper sides of plates 146 secured to lugs projecting from the under side of the base plate (Fig. 6). The rear end of the clamp carriage is provided with a fulcrum pin 148 engaging a fulcrum block 150 which is mounted to slide longitudinally or lengthwise of a buttonhole in a guideway formed in the base plate. The clamp carriage is fed lengthwise of the buttonhole by a cam groove 152 formed in the cam disc 62 and engaged by a roll 154 mounted on the lower end of the pivot pin 148. The clamp carriage is moved laterally during the sewing about the eye of the buttonhole by a cam groove 156 formed in the disc 62 and engaging a roll at the rear end of a lever 158. The forward end of the lever is provided with a pin 160 engaging a block 162 fitting within a guideway 164 on the clamp carriage.

The upper work clamping members or jaws 166 are pivoted in the forward ends of two clamp arms 168, the rear ends of which are pivoted in blocks 170 adjustably secured to the work supporting plates 172. The plates are connected with the clamp carriage by the pivot screws 174, and are retained in position by the spring-pressed bars

176 which are mounted in bearings 178 on the carriage and are provided with depending fingers engaging slots 180 in the plates, as in the machine of Patent No. 1,063,880. The means for closing the clamps comprises a lever 182 mounted to rock on a stud 184 which is secured in bearings on the clamp carriage to the rear of the work supporting plates. Spring arms 186 are secured by a clamping plate 188 to the lever 182, and are arranged to bear upon the clamp arms 168 near their forward ends. The clamp closing lever 182 is forced in a direction to release the clamps by a spring 190, and is forced in a direction to close the clamps by a roll 192 carried on an arm 194 which is secured to a rock shaft 196. The roll is arranged to engage a bearing surface 198 at the lower end of the lever and rock the lever against the action of the spring 190 when the roll carrying arm is swung downward from the position indicated in Fig. 17. When the roll carrying arm is moved into clamp closing position the roll is brought into a recess 200 at the lower end of the lever, and retains the lever in this position until the roll carrying arm is again swung upward into the position indicated in Fig. 17. The means for rocking the shaft 196 to close the clamps comprises a sleeve 202 mounted to oscillate on a stud 204 and provided with an arm 206 which is pivotally connected to the uper end of a rod 208 which is arranged to slide vertically through a bearing 210 (Fig. 5). The lower end of the rod is arranged to engage a pin 212 which projects laterally from an arm 214 secured to the end of the rock shaft 196.

The cutter 216 for cutting the buttonhole slit is secured in the end of a cutter lever 218 which is supported upon the inner ends of the adjustable fulcrum screws 220 (Fig. 5). The fulcrum screws for the lever are arranged below and to the rear of the work supporting plates, and in such position with relation to the sewing mechanism that in swinging about the fulcrum pins the cutter will move from its upper position, where it is out of the path of the upper needle bar, down into position to cut the buttonhole slit, with its bar end in register with the sewing mechanism. The cutter is operated from the oscillating sleeve 202 through an arm 222 projecting from the sleeve and connected with the cutter lever through the link 224 and toggle 226.

Since the cutter cuts the buttonhole slit in register with the sewing mechanism, the throat plate through which the needles reciprocate during the sewing is so mounted on the turret that it may be displaced by an anvil which is movable into and out of position to co-operate with the cutter. As shown in Figs. 8 to 11, the throat plate 228 is mounted in a supporting arm 230 secured to one end of a rock shaft 232 which is mounted in a bearing on the turret. The other end of the rock shaft is provided with an arm 234, the outer end of which is engaged by a spring 236 which tends to hold the throat plate in active position with a stop lug 238 on the arm 230 in engagement with a fixed stop shoulder 240. The anvil or brass 242 for cooperating with the cutter in cutting the buttonhole slit is secured upon the forward end of a slide 244 mounted in an inclined radial guideway 246 which is formed in a plate 248 secured to the upper edge of the turret. The slide is advanced and retracted by a lever 250 pivoted upon the upper end of an oscillating arm 252 and provided at its forward free end with a tongue and groove adapted to engage a tongue and groove 254 on the slide when the turret is in stopped position. The lever is held in position on the arm 252 by a spring 256 engaging the rear end of the lever, and the normal position of the lever on the arm is determined by the engagement of a stop arm 258 on the lever with a shoulder on the arm 252. When the anvil slide is advanced it also moves upward to bring the anvil into engagement with the under surface of the work, and as it advances its forward end engages the arm 230 carrying the throat plate, and swings the throat plate out of active position, as indicated in Fig. 11. After the buttonhole slit has been cut the slide is retracted so that the throat plate is free to return to active position. As the slide reaches its retracted position a finger 260 on the forward end of the slide engages the lug 238 on the arm 230 and ensures the return of the throat plate to active position. The rotation of the turret during the sewing disengages the anvil slide from the lever 250, and the throat plate and slide are thereafter held in position by the spring 236 until the slide and lever are re-engaged by the movement of the turret as it completes its revolution. The arm 252 is secured to a rock shaft 262 which is oscillated to advance and retract the anvil slide prior to the beginning of the sewing by a cam slot 264 formed in a reciprocating plate 266 and engaging a roll 268 on one end of an arm 270, the other end of which is secured to the rock shaft.

The cam plate 266 is reciprocated to advance and retract the cutter anvil, and the sleeve 202 is oscillated by a pneumatically operated piston 272 which makes one reciprocation preparatory to the sewing of each buttonhole. As shown, the piston is secured upon the inner end of a piston rod 274, and fits within a cylinder 276. The piston passes through a stuffing box 278 at the inner end of the cylinder, and is provided at its outer end with a block or head 280. This block carries the cam plate 266, and is also pivotally connected to the lower end of an arm 282 extending downward from the sleeve 202. The outer end of the cylinder 276 is supported upon a pivot 284 so that it may have a slight rocking movement to compensate for the swinging movement of the arm 282. When compressed air is admitted back of the piston it is quickly advanced to the inner end of the cylinder, thus advancing the cam plate 266 and rocking the sleeve 202. During the first part of this movement the clamp closing mechanism is operated, and the anvil slide is advanced to remove the throat plate from active position and to bring the cutting anvil into active position. The cutter lever is also moved downward toward the work. During the latter part of the forward movement of the piston the anvil is retained in position by the dwell at the end of the cam slot 264, and the cutter is given its final downward movement to cut the buttonhole slit. As the piston reaches the inner end of the cylinder, air is admitted in front of the piston, and the exhaust port at the opposite end of the cylinder opened, so that the piston immediately returns to its initial position at the outer end of the cylinder. During this movement the cam plate 266 is returned to initial position to withdraw the anvil slide and return the throat plate to active position. This movement also returns the sleeve 202 to initial position. This return movement of the sleeve operates the devices for spreading the work clamps, and also starts the driving mechanism for the sewing shaft.

As shown, the means for spreading the work clamps comprises a slide bar 286 mounted in the clamp closing lever 182 and provided at its forward end with inclined surfaces adapted to engage lugs 288 which project from the inner edges of the work supporting plates at their rear ends. The spreader bar is forced toward its retracted inactive position by a spring 290 surrounding the bar within a recess in the lever 182 and engaging a sleeve 292 secured to the rear end of the bar. The rear end of the sleeve is arranged to be engaged by a pawl 294 which is carried by the sleeve 202. The pawl is pivoted at 296 on an arm projecting from the sleeve, and is held yieldingly in position with its upper end in engagement with a fixed stop 298 by a spring-pressed pin 300. When the clamp closing lever is rocked to close the clamp the sleeve 292 at the rear end of the spreader bar engages the under side of the pawl 294 and swings the pawl upward from the position indicated in Fig. 17. The oscillating movement of the sleeve in closing the clamp and operating the cutter carries the end of the pawl back of the rear end of the sleeve 292, so that the pawl snaps down into position back of the sleeve. When the sleeve 202 is rocked in the opposite direction by the return movement of the piston the pawl forces the spreader bar forward to spread the work clamps. The engagement of the lugs 288 with the parallel side edges at the front end of the bar act by frictional engagement with the bar to retain it in position against the pressure of the spring 290 during the sewing, and until the clamp carriage is returned to initial position and the clamps are opened. This removes the pressure on the sides of the bar so that the spring returns the bar to inactive position.

The means for controlling the compressed air which reciprocates the piston 272 comprises a rotary valve 302 provided with supply ports 304 arranged to be alternately brought into register with a supply passage 306 the opposite ends of which communicate with the ends of the cylinder 276 through the supply ports 308. The ports 304 communicate through an axial passage 310 with two radial passages 312, one of which is always in communication with a supply passage 314 in the valve casing. The supply passage 314 is connected with a source of compressed air through a pipe 316, the upper end of which connects with a passage 318 passing through one of the trunnions upon which the machine casing is supported. The outer end of the passage 318 communicates with a supply pipe 320 connected to a stuffing box fixed to the bearing for the trunnion. The valve 302 is provided with exhaust ports 322 adapted to be brought alternately into register with an exhaust passage 324, the ends of which communicate with the opposite ends of the cylinder 276 through exhaust ports 326.

The means for operating the valve to control the supply and exhaust of the air at the opposite ends of the cylinder comprises a rack bar 328 mounted to slide in a guideway formed in a bracket 330 on the side of the cylinder 276. The rack bar engages a gear segment on the valve, and is provided with upturned ends 332 and 334 arranged to be engaged by sleeves 336 and 338 which are mounted to slide in a bracket 330. A spring 340 is interposed between the sleeves and tends to force them in opposite directions. A rod 342 passes through the sleeves and is provided near its forward end with a shoulder 344 adapted to engage the outer end of the sleeve 338, and is provided at its outer end with a collar 346 adapted to engage the outer end of the sleeve 336. The forward end of the rod is connected by a pivot pin 348 with the head 280 on the forward end of the piston rod. The sleeves 336 and 338 are alternately locked against movement by a locking lever 350 provided with fingers 352 and 354 adapted to engage the outer ends of the sleeves, and held in normal position by a spring 356.

The parts are normally in the position indicated in Fig. 13. With the parts in this position the inner end of the cylinder is in communication with the air supply and the piston is held at the outer end of the cylinder. The sleeve 336 is engaged by the locking finger 352 and is held from movement toward the left. The shoulder 344 on the rod 342 is in engagement with the sleeve 338 and holds the spring 340 under compression. The end 332 of the rack bar 328 is in engagement with the outer end of the sleeve 336. When the machine is to be started the locking lever 350 is rocked by the depression of a trip lever 362, the lower end of which carries a dog 364 adapted to engage a lug 366 projecting from the side of the locking lever. The dog is held in position over the lug, as indicated in Fig. 13, by a spring 368 which holds the horizontal arm of the dog in engagement with a stop pin 370. When the trip lever is depressed the horizontal arm of the dog strikes a fixed pin 372, so that the vertical arm of the dog is swung to the right out of the path of the lug 366 where it will not interfere with the movements of the lever in case the operator does not release the latch lever before the forward movement of the piston is completed. When the locking lever is rocked the locking finger 352 is disengaged from the sleeve 336, and the spring 340 shifts the sleeve and the rack bar 328 to the left in Fig. 13. This rocks the valve to supply air to the outer end of the cylinder, and to open the exhaust at the inner end of the cylinder. This movement of the locking lever also brings the locking finger 354 into active position in front of the sleeve 338, where it is held by the sleeve 336 which now underlies the end of the finger 352. The movement of the rack bar 328 also brings its upturned end 334 into engagement with the outer end of the sleeve 338. As the piston nears the inner end of the cylinder the collar 346 engages the outer end of the sleeve 336 and moves it toward the right into the position indicated in Fig. 13, thus recompressing the spring 340 and bringing the sleeve into position to be again locked by the locking finger 352. During the compression of the spring the sleeve 338 is held against movement toward the right by the locking finger 354 until the lever 350 is released by the movement of the sleeve 336 when the lever returns to normal position, releasing the sleeve 338 and relocking the sleeve 336. When the sleeve 338 is released it is shifted toward the right by the spring 340 and by its movement shifts the rack bar 328 and the valve 302 to the position indicated in this figure. This shuts off the supply and opens the exhaust at the outer end of the cylinder, and shuts off the exhaust and opens the supply to the inner end of the cylinder, so that the piston is immediately returned to its initial position. During the latter part of this movement the shoulder 344 on the rod 342 engages the sleeve 338 and forces it toward the left into the position indicated in Fig. 13, the sleeve 336 being held against movement by the locking finger 352. The parts remain in this position until the trip lever 362 is again raised to bring the dog 364 over the lug 366, and is again depressed to throw out the locking lever. The tripping lever is held normally in raised position by a spring 374.

As the piston reaches its initial position the driving mechanism for the sewing shaft and feed cam is thrown into operation. This driving mechanism is similar in construction to that shown and described in application Serial No. 104,449, filed June 19, 1916, and comprises a clutch member 376 secured to the sewing shaft, and a co-operating clutch member on a driving pulley 378. The driving pulley is forced in a direction to engage the clutch members by a spring 380, and is moved to disengage the clutch members by a clutch actuating sleeve 382 provided with two cam segments 384 arranged to co-operate with cam segments 386 formed on a stationary disc 388. The disc 388 may be readily adjusted by the operator by means of a shaft 390, the forward end of which is provided with a knurled head, and the rear end of which is provided with a worm engaging the worm teeth on the periphery of the disc. The means for rocking the cam sleeve 382 to disengage the clutch, and for releasing it to allow the spring 380 to engage the clutch, will be described later in connection with the description of the devices for stopping the sewing shaft in predetermined position.

The devices for stopping the sewing shaft comprise a stop cam 392 connected with the clutch member 376, and a cooperating stop plunger 394 mounted to move lengthwise in a plunger carrying lever 396 which is mounted to swing about a pivot 398. The stop plunger is forced forward in the carrying lever by a heavy spring 400 interposed between the end of an adjusting sleeve 402 and a block 404 secured to the plunger and fitting within a guideway in the lever. The lever is provided with an arm 406, the lower end of which is adapted to be engaged by the rear end of an actuating rod 408, the forward end of which is connected to the arm 222 through which the cutter is actuated. The stop cam is provided with an eccentric portion with a stopping depression following the eccentric portion, and with a swell or eccentric portion following the stopping depression. The low part of the cam is somewhat nearer its axis than the stopping depression. When the parts are in stopped position, as indicated in Figs. 4, 22 and 23, the rear end of the rod 408 rests against the side of the arm 406, being pressed against the arm by a spring 409. When the advance of the pneumatically operated piston swings the arm 222 forward or toward the left in Fig. 4, the rear end of the rod 408 is moved forward, and as it disengages the end of the arm 406 it is moved laterally by the spring 409 into position in front of the arm. As the piston completes its return movement the end of the rod engages the arm 406 and swings the stop plunger carrying lever about its pivot to carry the upper end of the stop plunger laterally out of engagement with and out of the path of the stop cam. As the plunger passes laterally off the cam, it moves forward slightly until the block 404 brings up against the end of its guide slot. This forward movement of the plunger is utilized to throw in the driving clutch. The plunger carries an arm 410 secured to the side of the block 404 and projecting upward, as indicated in Figs. 22 and 23. When the plunger moves forward slightly as above described, a lug 412 on the arm 410 strikes the tail of a pawl 414 which has been holding the clutch operating cam disc 382 in clutch disengaging position, and disengages the pawl from the disc so that the disc is free to rock and permit the engagement of the clutch. The actuating rod 408 continues to hold the carrier lever for the stop plunger during the sewing of the buttonhole and until the feed cam has made a complete revolution. As the feed cam completes its revolution a trip finger 416 formed on the outer end of the plate 78 which is secured to the under side of the feed cam disc engages the lower end of a lever 418, the upper end of which is arranged at one side of the rod 408, and swings the lever so that its upper end pushes the rod 408 laterally and disengages it from the arm 406. When this occurs the spring 420 forces the plunger carrier lever laterally to bring the stop plunger into the path of the stop cam. The side of the plunger first rides against the side of the cam and rides along the cam surface 422 which terminates at the low part of the cam. As the rotation of the sewing shaft continues, the plunger rides along the periphery of the braking portion of the cam, and is thus forced back against the tension of the spring 400 until the end of the plunger enters the stopping recesses. As the plunger is forced back by the stopping cam, a projection 424 on the end of the arm 410 engages an arm 426 on the cam disc 382, and rocks the cam disc to disengage the driving clutch and bring the notch in the disc into position to be engaged by the latch 414. The clutch is disengaged by the plunger as it starts up the eccentric braking portion of the stop cam, and at a uniform interval before the shaft reaches its stopping position. The timing of the disengagement of the clutch with relation to the stopping position may be readily varied by the operator by adjustment of the stationary cam disc 388.

To prevent the accidental or improper operation of the starting trip lever 362 during the operation of the sewing and feeding mechanisms, a locking device is provided which is rendered active and inactive by the movement of the stop plunger into starting and stopping positions. As shown, this locking device comprises a lever 428, the forward end of which is provided with a hook 430 adapted to engage a finger 432 on the trip lever when the trip lever is in normal raised position. The rear end of the lever is arranged to underlie a pin 434 projecting from the side of the plunger carrying lever 396. When the plunger carrying lever is in stopping position, the pin 434 depresses the rear end of the locking lever 428 and holds the hook at its forward end out of the path of the finger on the tripping lever. When the plunger carrying lever swings into active or driving position the pin 434 releases the locking lever so that it is free to lock the tripping lever if the lever is returned to normal position, or whenever it is released by the operator and returns to normal position. A second depression of the tripping lever after it has been once depressed to start the machine is therefore prevented until the sewing of the buttonhole has been completed and the parts brought to stopping position.

After the sewing has been completed, and the stitch forming and feeding mechanisms have been brought to rest, the tension on the upper thread is released and the thread is severed and held, and immediately thereafter the work clamp is opened. These operations are effected through the movement of the stop plunger into the stopping depression in the stop cam. As shown, the means for releasing the tension on the upper thread comprises a bar 436 mounted to slide in guides formed in the head of the machine and having a wedge-shaped forward end adapted to enter between and spread the discs of the tension device 124 (Fig. 4). The bar is forced in a direction to apply the tension by a spring 438. The bar is held from rotation in its bearings by a second bar 440 connected to its rear end by a clamp block 442. The rear end of the bar 440 is arranged to be engaged by the upper end of a releasing lever 444, the lower end of which is provided with an inclined surface 446 adapted to be engaged by a pin 448 projecting laterally from the forward end of a lever 450. The rear end of the lever is offset laterally and carries a spring-pressed pin 452 adapted to engage a notch 454 in the lower end of the stop plunger. When the parts are in stopped position as indicated in Fig. 4, the pin is in engagement with the notch in the plunger, and the lever 450 is held in such position that the tension is released. When the plunger carrying lever is swung to start the sewing mechanism the pin is disengaged from the notch in the end of the plunger, and the rear end of the lever 450 swings downward until arrested by the adjustable stop screw 456. This movement of the lever raises the pin 448 and frees the releasing lever 444 so that the bar 436 may move to apply the tension when permitted to do so by the mechanism which times the application of the tension at the beginning of the sewing.

To avoid withdrawing the end of the needle thread from the thread holder during the initial stroke of the upper needle, the tension should not be applied until the first stitch has been completed. Means is therefore provided for delaying the application of the tension at the beginning of the sewing until the second downward stroke of the needle. As shown, this means comprises a controlling plate 458 formed on the lower end of a bell crank lever 460 and arranged to be engaged by the rear end of the tension releasing bar 436 (Figs. 2, 3 and 4). This plate is provided with a shoulder 462 adapted to engage the side of the bar, a hole 464 through which the rear end of the bar may pass, and an intermediate notch 466. The plate is forced in a direction to engage the shoulder 462 with the rear end of the bar by a spring 468. The end of the bell crank lever is provided with two fingers or teeth 470 and 472 which are adapted to be successively engaged by a pin 474 projecting from the forward arm of the crank 26. When the bar 436 is moved forward to release the tension at the completion of the sewing the bell crank lever carrying the controller plate 458 is swung into the position indicated in Figs. 2 and 3 by the spring 468, this position being determined by the engagement of the shoulder 462 with the rear end of the bar. When the sewing shaft is started at the beginning of the sewing operation the pin 474 during the first revolution of the sewing shaft strikes the tooth 472 and advances the controller plate to bring the notch 466 into register with the rear end of the bar 436. The bar enters the notch and holds the plate in this position during the first revolution of the sewing shaft. During the first part of the second revolution of the shaft the pin 474 acts on the tooth 470 to swing the controller plate and bring the hole 464 into register with the bar 436 when the end of the bar enters the hole, thus applying the tension and locking the controller plate against the tension of the spring 468. When the bar 436 is again advanced to release the tension at the completion of this sewing operation, its rear end is withdrawn from the hole 464, so that the controller plate is returned to the position indicated in Fig. 3, by the spring 468, ready for the next cycle of operations.

The means shown for severing and holding the upper needle thread comprises two bars 476 and 478 mounted to slide in a guideway 480 formed on the under side of the right-hand clamp arm 168. The forward end of the bar 476 is provided with a laterally projecting thread engaging finger 482 arranged to pass between a spring gripping plate 484 and a cutter plate 486 at the forward end of the bar 478. The rear end of the bar 478 is provided with an enlargement 488 adapted to engage the rear end of the guide 480 and limit the forward movement of the bar. A spring 490 is interposed between the rear end of the bar 478 and the enlarged rear end 492 of the bar 476, and causes the bars to move forward together until the forward movement of the bar 478 is arrested. The bar 476 is provided with a lug 494 arranged to play in a slot 496 in the edge of the bar 478 which permits the bar 476 to move forward independently of the bar 478 when the forward movement of the latter is arrested. The bars are advanced and retracted through a lever 498, the end of which is provided with a pin 500 engaging a transverse slot in the rear end of the bar 476. The outer end of the lever is pivoted at 502 to a bracket 504 secured to the right-hand work supporting plate 172, and the lever is forced yieldingly in a direction to retract the bars by a spring 506. The fully retracted position of the bars is determined by the engagement of the lever with a stop lug 508 on the bracket 504. When the parts are in stopped position the bars are in thread holding relation, and are held in the position indicated in Fig. 21 by the engagement of the end of the lever 498 with the forward end of a stop lever 510. When the parts are in this position the thread finger 482 and plate 484 co-operate in holding the end of the needle thread in such position that it will be covered by the end of the seam at the beginning of the next sewing operation. As the sewing progresses and the clamp carriage moves toward the left in Fig. 21, the thread gripping bars remain in position, and the travel of the work draws the end of the thread from between the thread holding members. During the continued movement of the clamp carriage a pin 512 which projects from the bearing bracket on the clamp carriage and supports the stop lever 510, rides under the cam surface 514 on the under edge of the lever and lifts the lever so that its forward end is disengaged from the lever 498. This lever is immediately swung back against the stop 508, retracting the thread holding bars so that their forward ends will be clear of the path of the needles during the continued movement of the clamp carriage. Thereafter the bars travel with the clamp carriage until the seam has been carried around the eye of the buttonhole and is being sewed along the opposite side of the buttonhole slit. During the sewing along this side of the buttonhole slit, and before the bar end of the buttonhole is reached, the lever 498 is quickly swung toward the left in Fig. 21 to advance the thread holder bars. The forward movement of the bar 476 is continued after the movement of the bar 478 is arrested, so that the thread finger 482 at the forward end of the bar 476 is brought into such position that during the completion of the seam the upper needle thread is brought by the travel of the clamp carriage and the rotation of the sewing mechanism into position in front of the finger. The lever 498 is thus moved through a slide bar 516, the forward end of which is arranged to engage a pin 518 projecting from the upper side of the lever (Figs. 4, 5 and 21). The bar is mounted to slide in suitable guides, and is forced rearwardly by a spring 520 interposed between the machine casing and a block 522 secured to the bar. The slide bar is advanced to advance the thread holding bars at the proper time through a lever 524 carrying a pawl 526 adapted to engage a notch 528 in the rear side of the block 522, and also carrying a roll 530 which engages a cam groove in the upper face of the gear 90. The pawl is forced in a direction to engage the block 522 by a spring 532. The tail of the pawl is provided with an inclined cam surface 534 adapted to be engaged by the lower end of an adjustable screw 536 carried by the lever 450 (Figs. 4, 5 and 6). This screw is disengaged from the tail of the pawl when the lever 450 is released in starting the sewing mechanism, as above described. This permits the pawl to engage the notch in the block 522 when the pawl carrying lever 524 is swung to the right by its operating cam, so that during the movement of the pawl carrying lever toward the left into the position indicated in Fig. 5, the slide bar 516 is advanced to advance the thread gripping bars into position to act upon the thread. When the lever 450 is rocked into the position indicated in Fig. 4 by the upward movement of the stop plunger at the completion of the sewing, as above described, the lower end of the screw 536 rides against the inclined surface 534 on the tail of the pawl, disengaging the pawl from the block 522, so that the slide bar is quickly retracted by its spring thus causing the thread holding and cutting bars to be retracted into the position indicated in Fig. 21, the rearward movement of the bars being arrested by the stop lever 510 which has been returned to active position by the return movement of the clamp carriage. As the bar 476 is retracted the thread finger at the forward end of the bar draws the upper needle thread under the spring plate 484, thus gripping the thread, and also draws the thread over the cutter blade 486, so that the thread is severed comparatively close to the work, and the end of the needle thread is held, preparatory to the next sewing operation.

The rearward movement of the slide bar 516 in operating the thread cutter and holder is utilized to open the clamp, thus ensuring the cutting and holding of the thread before the work clamp is opened and the cutter and holder raised by the upward movement of the clamp arm on which it is mounted. As shown, the clamp opening mechanism comprises a lever 538, the forward end of which carries a pivoted dog 540 having a vertical arm arranged to underlie the rear end of an arm 542 which is secured to the rock shaft 196. When the rock shaft is in clamp closing position, and the clamp has reached its retracted position, the upper end of the dog 540 registers with a notch in the rear end of the arm 542. The dog is held yieldingly in normal position with a stop 544 on its lower end in engagement with the under side of the lever 538 by a spring 546 which also tends to draw the dog and outer end of the lever downward from the position indicated in Figs. 4 and 8. The rear end of the lever 538 is engaged by the lower end of a vertically sliding pin 548, the upper end of which is arranged to be engaged by the forward end of a lever 550. The lever 550 is provided with a laterally projecting pin 552 arranged to be engaged by a cam 554 on the block 522. As the slide bar 516 which carries the block 522 completes its rearward movement, after causing the operation of the thread cutter and holder, the cam 554 depresses the lever 550 and pin 548, thus rocking the lever 538 and forcing the dog 540 upward. This movement of the dog rocks the rock shaft 196 to open the work clamps. When the sleeve 202 is rocked to close the clamp and operate the buttonhole cutter, a finger 556 carried on an arm projecting downward from the cutter lever engages the dog 540 and swings it out of the path of the arm 542, so that it does not interfere with the closing of the clamp. When the slide bar 516 is advanced during the latter part of the sewing, the cam 554 releases the lever 550 and pin 548, so that the spring 546 may thus swing the end of the lever 538 and the dog 540 downward, and thus bring the upper end of the dog into position to register with the notch in the end of the arm 542 as the clamp carriage completes its rearward movement.

To enable the sewing shaft to be turned to a limited extent by hand, means is provided for moving the stop plunger laterally away from the stop cam, and at the same time preventing the disengagement of the latch 414 which would cause an engagement of the driving clutch. As shown, this means comprises a lever 558 provided at its lower end with an operating handle 560, and provided at its upper end with two arms, one of which carries a cam 562 for engaging a projection 564 on the arm 410, and also arranged to pass over a laterally projecting lug 566. The inclined surface of the cam acts to force the plunger carrier lever laterally to free the stop plunger from the stop cam while the under surface of the cam engages the lug 566 and prevents the upward movement of the stop plunger, which otherwise would rock the pawl 414 and engage the driving clutch. The end of the other arm at the upper end of the lever 558 enters a recess 568 in a disc 571 which is connected with the stop cam. A locking groove 573 communicates with the recess 568 and permits a limited turning movement to be given to the sewing shaft, but prevents the return of the lever 560 to inactive position until the shaft is returned to its original position with the recess 568 in register with the end of the arm, as more fully disclosed in Patent No. 1,181,766, May 2, 1916, which shows and describes a similar mechanism. When the lever 558 is moved to render the stop plunger inactive, a pin 570 projecting from the handle 560 rocks a bell crank lever 572 and moves the lower end into position to permit the lateral movement of the rod 408 into position in front of the arm 406. When the lever 558 and its handle 560 are returned to normal position the bell crank lever is also returned to inactive position by a spring 574.

The stitch forming mechanism shown and described is claimed in a divisional application, Serial No. 288,905, filed April 10, 1919.

While it is preferred to employ the specific construction and arrangements of parts shown and described, it will be understood that such construction and arrangement is not essential to the broader features of the invention, and may be varied or modified as found desirable or best suited to the construction and mode of operation of any machine in which such features are to be embodied.

Having explained the nature and object of the invention, and specifically described one form of machine in which it may be embodied, what is claimed is:—

1. A buttonhole sewing machine having, in combination, stitch forming mechanism, a work clamp, feed mechanism for relatively moving the stitch forming mechanism and clamp to sew about a buttonhole, and mechanism actuated by fluid under pressure for closing the clamp and starting the stitch forming and feeding mechanisms.

2. A buttonhole sewing machine having, in combination, stitch forming mechanism, a work clamp, feed mechanism for relatively moving the stitch forming mechanism and clamp to sew about a buttonhole, a buttonhole cutter, and mechanism actuated by fluid under pressure for closing the clamp, operating the cutter and starting the stitch forming and feeding mechanisms.

3. A buttonhole sewing machine having, in combination, stitch forming machanism, a work clamp, feed mechanism for operatively moving the stitch forming mechanism and clamp to sew about a buttonhole, a buttonhole cutter, a spreader, and mechanism actuated by fluid under pressure for closing the clamp, operating the cutter and spreader, and starting the stitch forming and feeding mechanisms.

4. A buttonhole sewing machine having, in combination, stitch forming mechanism, a work clamp, feed mechanism for relatively moving the stitch forming mechanism and clamp to sew about a buttonhole, a reciprocating piston connected to close the clamp and start the stitch forming and feeding mechanisms, and means for applying fluid under pressure to the piston to advance and retract the same preparatory to the sewing.

5. A buttonhole sewing machine having, in combination, stitch forming mechanism, a work clamp, feed mechanism for relatively moving the stitch forming mechanism and clamp to sew about a buttonhole, a buttonhole cutter, a reciprocating piston connected to close the clamp, operate the cutter and start the stitch forming and feeding mechanisms, and means for applying fluid under pressure to the piston to advance and retract the same preparatory to the sewing.

6. A buttonhole sewing machine having, in combination, stitch forming mechanism, a work clamp, feed mechanism for relatively moving the stitch forming mechanism and clamp to sew about a buttonhole, a buttonhole cutter, a spreader, a reciprocating piston connected to close the clamp, operate the cutter and spreader and start the stitch forming mechanism, and means for applying fluid pressure to the piston to advance and retract the same preparatory to the sewing.

7. A buttonhole sewing machine having, in combination, stitch forming mechanism, a work clamp, feed mechanism for relatively moving the stitch forming mechanism and clamp to sew about a buttonhole, a buttonhole cutter, a piston connected to close the clamp, operate the cutter and start the stitch forming and feeding mechanisms, means for applying fluid pressure to the piston to advance and retract it preparatory to the sewing, a manually-operated trip for starting said means, and means for preventing a second operation of the trip until the sewing is completed.

8. A buttonhole sewing machine having, in combination, stitch forming mechanism, a work clamp, feed mechanism for relatively moving the stitch forming mechanism and clamp to sew about a buttonhole, a buttonhole cutter mounted to cut in register with the stitch forming mechanism, an anvil movable into and out of active position, a piston connected to close the clamp, operate the cutter and anvil and start the sewing and feeding mechanisms, and means for applying fluid pressure to the piston to advance and retract it preparatory to the sewing.

9. A buttonhole sewing machine having, in combination, stitch forming mechanism, a work clamp, feed mechanism for relatively moving the stitch forming mechanism and clamp to sew about a buttonhole, a buttonhole cutter mounted on a fixed support to cut in register with the stitch forming mechanism, an anvil mounted to slide in an inclined guideway to and from position to register with the cutter, and mechanism for reciprocating the cutter and anvil.

10. A buttonhole sewing machine having, in combination, stitch forming mechanism, a work clamp, feed mechanism for relatively moving the stitch forming mechanism and clamp to sew about a buttonhole, a cutter lever mounted to oscillate about a fixed axis and to cut in register with the stitch forming mechanism, an anvil mounted to slide in an inclined guideway to and from position to register with the cutter, and mechanism for oscillating the cutter and for reciprocating the anvil slide.

11. A buttonhole sewing machine having, in combination, stitch forming mechanism comprising an upper needle and complemental under mechanism, a turret carrying the under mechanism, a buttonhole cutter mounted to cut in register with the stitch forming mechanism, an anvil mounted to slide radially in the turret to and from position to register with the cutter, and a reciprocating actuator with which the anvil is connected by the rotation of the turret into stopped position.

12. A buttonhole sewing machine having, in combination, stitch forming mechanism comprising an upper needle and a complemental under mechanism, a turret carrying the under mechanism, a buttonhole cutter mounted to cut in register with the stitch forming mechanism, a throat plate mounted to move on the turret to and from active position, an anvil independently mounted to move on the turret to and from position to register with the cutter and provided with means for positively moving the throat plate in both directions, and mechanism for actuating the cutter and reciprocating the anvil.

13. A buttonhole sewing machine having, in combination, stitch forming mechanism comprising an upper needle and a complemental under mechanism, a turret carrying the under mechanism, a buttonhole cutter mounted to cut in register with the stitch forming mechanism, a throat plate, a support therefor pivoted on the turret, an anvil mounted to slide in a radial guideway in the turret and arranged to displace the throat plate, and means for actuating the cutter and reciprocating the anvil.

14. A buttonhole sewing machine having, in combination, stitch forming mechanism, a work clamp, a buttonhole cutter arranged to cut in register with the stitch forming mechanism, feed mechanism for moving the clamp lengthwise and transversely of the buttonhole slit and for rotating the stitch forming mechanism, a thread cutter and holder for the needle thread, actuating mechanism for closing the clamp, operating the buttonhole cutter and starting the stitch forming and feeding mechanisms, mechanism for stopping the stitch forming and feeding stop mechanisms at the completion of the sewing, and means controlled from the stop mechanism for actuating the thread cutter and holder and for opening the clamp.

15. A buttonhole sewing machine having, in combination, stitch forming mechanism, a work clamp, a buttonhole cutter arranged to cut in register with the stitch forming mechanism, feed mechanism for moving the clamp lengthwise and transversely of the buttonhole slit and for rotating the stitch forming mechanism, a thread cutter and holder for the needle thread, actuating mechanism for closing the clamp, operating the buttonhole cutter and starting the stitch forming and feeding mechanisms, stop mechanism for stopping the stitch forming and feeding mechanisms at the completion of the sewing, and means controlled from the stop mechanism for successively releasing the tension on the needle thread, actuating the thread cutter and holder and opening the clamp.

16. A buttonhole sewing machine having, in combination, stitch forming mechanism, a work clamp, a buttonhole cutter mounted in fixed relation to the stitch forming mechanism to cut the buttonhole slit in register therewith, feed mechanism for the work clamp, gearing for continuously and positively connecting the stitch forming and feeding mechanisms, a thread cutter and holder for the needle thread, stop mechanism for stopping the stitch forming and feeding mechanisms at the completion of the sewing, and mechanism for actuating the thread cutter and holder and for opening the clamp after the stopping of the stitch forming and feeding mechanisms.

17. A buttonhole sewing machine having, in combination, stitch forming mechanism, a work clamp, feed mechanism for moving the clamp lengthwise and transversely of the buttonhole and for rotating the stitch forming mechanism, a buttonhole cutter mounted to cut in register with the stitch forming mechanism, a thread cutter and holder, mechanism for closing the clamp and actuating the buttonhole cutter preparatory to the sewing, and mechanism for operating the thread cutter and holder and for opening the clamp after the sewing is completed.

18. A buttonhole sewing machine having, in combination, stitch forming mechanism, a work clamp, feed mechanism for moving the clamp lengthwise and transversely of the buttonhole and for rotating the stitch forming mechanism, a buttonhole cutter, mechanism for closing the clamp, operating the cutter and starting the stitch forming and feeding mechanisms, mechanism for simultaneously stopping the stitch forming and feeding mechanisms, and mechanism for automatically cutting and holding the needle thread and for opening the clamp.

19. A buttonhole sewing machine having, in combination, stitch forming mechanism, a work clamp, feed mechanism for relatively moving the stitch forming mechanism and work clamp to sew about a buttonhole, a cutter lever mounted to rock about a fixed axis and to cut the buttonhole slit in register with the stitch forming mechanism, and mechanism for oscillating the cutter lever and automatically closing the clamp preparatory to starting the stitch forming and feeding mechanisms.

20. A buttonhole sewing machine having, in combination, stitch forming mechanism comprising an upper needle and a complemental under mechanism, a turret carrying the under mechanism, a throat plate and a cutter anvil on the turret alternately movable into and out of active position, a work clamp, a cutter lever mounted to rock about a fixed axis and to co-operate with the anvil in cutting the buttonhole slit in register with the stitch forming mechanism, and mechanism for automatically closing the clamp and actuating the cutter lever and anvil preparatory to starting the stitch forming mechanism.

21. A buttonhole sewing machine having, in combination, stitch forming mechanism comprising an upper needle and a complemental under mechanism, a turret carrying the under mechanism, a throat plate and a cutting anvil on the turret alternately movable into and out of active position, a work clamp, feed mechanism for moving the clamp lengthwise and transversely of the buttonhole slit and for rotating the turret and upper needle to sew about a buttonhole, a cutter lever mounted to rock about a fixed axis and to co-operate with the anvil in cutting the buttonhole slit in register with the stitch forming mechanism, and mechanism for automatically closing the clamp and actuating the cutter lever and anvil preparatory to starting the stitch forming mechanism.

22. A buttonhole sewing machine having, in combination, stitch forming mechanism, a work clamp, feed mechanism for relatively moving the stitch forming mechanism and the clamp to sew about a buttonhole, mechanism for rotating the stitch forming mechanism rotation after rotation in the same direction in sewing successive buttonholes, a cutter mounted to cut the buttonhole slit in register with the stitch forming mechanism, and mechanism for closing and opening the clamp and for operating the cutter.

23. A buttonhole sewing machine having, in combination, stitch forming mechanism, a work clamp, feed mechanism for relatively moving the stitch forming mechanism and work clamp to sew about a buttonhole, mechanism for rotating the stitch forming mechanism rotation after rotation in the same direction in sewing successive buttonholes, a cutter mounted to cut the buttonhole slit in register with the stitch forming mechanism, mechanism for closing the clamp, operating the cutter and starting the stitch forming, feeding and rotating mechanisms, mechanism for simultaneously stopping said mechanisms, and mechanism for opening the clamp.

24. A buttonhole sewing machine having, in combination, stitch forming mechanism, a clamp carriage, clamps on the carriage, a rock lever on the carriage provided with forwardly projecting arms engaging the clamps and with a downwardly extending arm provided with a bearing surface terminating in a retaining recess, a rocking arm mounted on the carriage for engaging said surface and recess to close and retain the clamps, and mechanism for rocking the arm to close and open the clamps.

25. A buttonhole sewing machine having, in combination, stitch forming mechanism, a clamp carriage, clamps on the carriage, a rock lever on the carriage provided with forwardly projecting arms engaging the clamps and with a downwardly extending arm provided with a bearing surface, a rocking arm on the carriage the end of which acts on the surface to close and open the clamps, and mechanism for rocking the arm to close the clamps preparatory to the sewing and another mechanism for rocking the arm to open the clamps after the sewing is completed.

26. A buttonhole sewing machine having, in combination, stitch forming mechanism, a clamp carriage, supporting guideways in which the carriage is horizontally movable, a sliding block to which the rear end of the carriage is pivoted, a roll on the carriage in line with its pivot, a cam engaging said roll, a guideway on the carriage, a block in the guideway, a lever one end of which is pivoted to the latter block, and a cam engaging the other end of the lever.

27. A buttonhole sewing machine having, in combination, stitch forming mechanism, a clamp carriage, a buttonhole cutter, a clamp-closing lever mounted on the carriage, a spreader bar mounted in the lever, and mechanism for closing the clamp, operating the cutter and advancing the spreader bar.

28. A buttonhole sewing machine having, in combination, stitch forming mechanism, a clamp carriage, a buttonhole cutter mounted on a fixed support to cut in register with the stitch forming mechanism, clamp-closing and retaining means on the carriage, a reciprocating clamp spreading bar on the carriage, and mechanism for automatically actuating the clamp-closing means and the cutter and for advancing the spreader bar while the stitch forming mechanism is at rest.

29. A buttonhole sewing machine having, in combination, stitch forming mechanism, a traveling work clamp, a thread holder on the clamp, a spring for closing and retracting the holder, a stop for determining the thread holding position of the holder when the machine is in stopped position, and means for operating the stop during the forward travel of the clamp to permit further retraction of the holder out of the path of the stitch forming mechanism.

30. A buttonhole sewing machine having, in combination, stitch forming mechanism, a traveling work clamp, a thread holder on the clamp, a spring for closing and retracting the holder, a stop for determining the thread holding position of the holder when the machine is in stopped position, means for operating the stop during the forward travel of the carriage to permit further retraction of the holder out of the path of the stitch forming mechanism, and means for advancing and opening the holder and for returning the stop to active position during the return travel of the clamp.

31. A buttonhole sewing machine having, in combination, stitch forming mechanism, a traveling work clamp, a thread holder on the clamp, a spring for closing the holder, a cam and connections for opening the holder, a latch for retaining the holder, and means for operating the latch to release the holder at the completion of the sewing.

32. A buttonhole sewing machine having, in combination, stitch forming mechanism, a traveling work clamp, a thread holder on the clamp, a spring for closing the holder, a slide for opening the holder, a cam for operating the slide to open the holder, a latch for retaining the slide, means for operating the latch to release the slide upon the completion of the sewing, and clamp-opening means operated by the slide.

33. A buttonhole sewing machine having, in combination, stitch forming mechanism, a traveling work clamp, a thread holder on the clamp, means for maintaining the holder in thread holding position at the beginning of the sewing and withdrawing it from the path of the stitch forming mechanism before the eye of the buttonhole is reached, means for advancing and opening the holder during the sewing of the second side of the buttonhole and before the bar end is reached, and means for closing the holder and for severing the thread after the completion of the sewing.

34. A buttonhole sewing machine having, in combination, stitch forming mechanism, a traveling work clamp, feed mechanism for moving the clamp, a thread holder on the clamp, a spring-operated lever on the clamp for opening and closing the holder, a slide for operating the lever to open the holder, a cam moving in time with the feed mechanism for advancing the slide, a spring for retracting the slide, a latch for holding the slide in advanced position, and means for releasing the latch at the completion of the sewing.

35. A buttonhole sewing machine having, in combination, stitch forming mechanism, a work clamp, a feed cam for the clamp, a thread holder and cutter on the clamp, a spring-pressed slide for opening the holder, a cam connected with the feed cam for moving the slide against the pressure of its spring to open the holder, a latch for retaining the slide, and means for releasing the latch at the completion of the sewing.

36. A buttonhole sewing machine having, in combination, stitch forming mechanism, a work clamp, a feed cam for the clamp, a thread holder and cutter on the clamp, a spring-pressed slide for opening the holder, a cam connected with the feed cam for moving the slide against the pressure of its spring to open the holder, a latch for retaining the slide, means for releasing the latch at the completion of the sewing, and clamp-opening means operated by the slide when released.

37. A buttonhole sewing machine having, in combination, stitch forming mechanism, a clamp carriage, clamp arms on the carriage, thread severing and holding bars mounted to slide on one of the arms, a spring for retracting the bars, a stop for determining the position of the bars when the machine is in stopped position, and means for operating the stop to permit further retraction of the bars during the forward travel of the carriage.

38. A buttonhole sewing machine having, in combination, stitch forming mechanism, a clamp carriage, clamp arms on the carriage, a guideway carried by one of the arms, bars sliding in the guideway and provided at their forward ends with thread holding and cutting members, a lever on the carriage connected to advance and retract the bars, a spring for holding the lever in retracted position, and means for operating and releasing the lever to advance and retract the bars.

39. A buttonhole sewing machine having, in combination, stitch forming mechanism, a work clamp, feed mechanism for relatively moving the stitch forming mechanism and clamp to sew about a buttonhole, a buttonhole cutter, an oscillating sleeve connected to close the clamp, to operate the cutter and start the stitch forming and feeding mechanisms, and a fluid-actuated piston connected to oscillate the sleeve.

40. A buttonhole sewing machine having, in combination, stitch forming mechanism, a work clamp, feed mechanism for relatively moving the stitch forming mechanism and the clamp to sew about a buttonhole, a buttonhole cutter, an oscillating sleeve connected to close the clamp and operate the cutter during its movement in one direction and to start the stitch forming and feeding mechanisms as it returns to initial position, and a fluid-actuated piston connected to oscillate the sleeve.

41. A buttonhole sewing machine having, in combination, stitch forming mechanism, a work clamp, feed mechanism for relatively moving the stitch forming mechanism and clamp to sew about a buttonhole, a piston connected to close the clamp and start the stitch forming and feeding mechanisms, a valve for controlling the supply of fluid under pressure to opposite sides of the piston, valve-operating mechanism, a manually-operated trip for operating the said valve mechanism to supply fluid to one side of the piston, and means connected with the piston for operating said mechanism to supply fluid to the opposite side of the piston as the piston completes its forward stroke.

42. A buttonhole sewing machine having, in combination, stitch forming mechanism, a work clamp, feed mechanism for relatively moving the stitch forming mechanism and clamp to sew about a buttonhole, a valve for controlling the supply of fluid under pressure to opposite sides of the piston, valve-operating mechanism comprising two slides, a spring tending to force the slides in opposite directions, a locking bar for alternately locking the slides, a rod connected to move with the piston having shoulders for alternately engaging the slides, a manually-operated trip for moving the locking bar in one direction, and a spring for returning the locking bar to intial position.

43. A buttonhole sewing machine having, in combination, stitch forming mechanism, a traveling work clamp, feed mechanism for the clamp, a buttonhole cutter mounted to cut the buttonhole in register with the stitch forming mechanism, a thread cutter and holder, stop mechanism for stopping the stitch forming and feeding mechanisms, and mechanism for automatically and successively releasing the tension on the needle thread, operating the thread cutter and holder to sever and hold the thread, and opening the clamp.

44. A buttonhole sewing machine having, in combination, stitch forming mechanism, a traveling work clamp, feed mechanism for the clamp, a buttonhole cutter mounted to cut the buttonhole in register with the stitch forming mechanism, a thread cutter and holder, stop mechanism for stopping the stitch forming and feeding mechanisms, and mechanisms actuated and controlled by the stopping mechanism for automatically releasing the tension on the needle thread, operating the thread cutter and holder, and opening the clamp.

45. A buttonhole sewing machine having, in combination, stitch forming mechanism comprising a reciprocating needle, feed mechanism for relatively feeding the work and stitch forming mechanism to sew about a buttonhole, a tension device for the needle thread, and means operated from the sewing shaft independently of the feed mechanism for preventing the application of the tension during the first stroke of the needle and applying it during the second cycle of the sewing mechanism.

46. A buttonhole sewing machine having, in combination, stitch forming mechanism comprising a reciprocating needle, a thread holder for holding the thread at the beginning of the sewing, a tension device, feed mechanism for relatively feeding the work and stitch forming mechanism to sew about a buttonhole, driving connections between the stitch forming mechanism and feed mechanism having provision for varying the number of stitches in the buttonhole, and means operated from the stitch forming mechanism independently of the feed for preventing the application of the tension until the second cycle of the stitch forming mechanism at the beginning of the sewing.

47. A buttonhole sewing machine having, in combination, stitch forming mechanism comprising a reciprocating needle, feed mechanism for relatively feeding the work and stitch forming mechanism to sew about a buttonhole, a tension device for the needle thread, a tension releasing device, a controller rendered active to prevent the application of the tension upon the operation of the tension releasing device at the completion of the sewing, and means for returning the controller to inactive position to apply the tension during the second cycle of the stitch forming mechanism at the beginning of the sewing.

48. A buttonhole sewing machine having, in combination, stitch forming mechanism comprising a reciprocating needle, feed mechanism for relatively feeding the work and stitch forming mechanism to sew about a buttonhole, a tension device for the needle thread, a tension releasing bar, a controller plate movable into position to retain the bar in tension releasing position upon the movement of the bar into this position, and driving connections between the stitch forming mechanism and controller plate by which the plate is returned to initial position, thereby permitting a return of the tension releasing bar to inactive position.

GEORGE S. HILL.

Certificate of Correction.

It is hereby certified that in Letters Patent No. 1,404,768, granted January 31, 1922, upon the application of George S. Hill, of Strafford, New Hampshire, for an improvement in "Buttonhole-Sewing Machines," errors appear in the printed specification requiring correction as follows: Page 11, line 87, claim 14, after the word "mechanisms" insert the word *stop*, and in line 89 the word "stop" before the word "mechanisms" should be omitted; and that the said Letters Patent should be read with these corrections therein that the same may conform to the record of the case in the Patent Office.

Signed and sealed this 17th day of April, A. D., 1922.

[SEAL.] KARL FENNING,

*Acting Commissioner of Patents.*